United States Patent
Riddle et al.

(10) Patent No.: US 12,366,952 B2
(45) Date of Patent: Jul. 22, 2025

(54) DYNAMIC CAROUSEL INTERFACE

(71) Applicant: Google LLC, Mountain View, CA (US)

(72) Inventors: Adam Samuel Riddle, Seattle, WA (US); Hunter Robbert Stich, Salvo, NC (US); Jonas Alon Naimark, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 195 days.

(21) Appl. No.: 18/080,380

(22) Filed: Dec. 13, 2022

(65) Prior Publication Data
US 2024/0053873 A1    Feb. 15, 2024

Related U.S. Application Data

(60) Provisional application No. 63/396,242, filed on Aug. 9, 2022.

(51) Int. Cl.
*G06F 3/0485* (2022.01)
*G06F 3/04845* (2022.01)

(52) U.S. Cl.
CPC ........ *G06F 3/04845* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 9,405,446 B1* | 8/2016 | Haitani | G06F 3/0481 |
| 10,775,971 B2* | 9/2020 | Bernaudin | G06F 3/0481 |
| 10,776,626 B1* | 9/2020 | Lin | G06V 10/82 |
| 11,164,240 B2* | 11/2021 | Mitchell | G06Q 30/0643 |
| 2005/0091596 A1* | 4/2005 | Anthony | G11B 27/34 |
| | | | 715/848 |
| 2015/0113482 A1* | 4/2015 | Breger | G06F 3/04817 |
| | | | 715/846 |
| 2016/0209994 A1* | 7/2016 | Kaufthal | G06F 9/45512 |
| 2017/0278216 A1* | 9/2017 | Milan | G06T 3/04 |
| 2018/0082152 A1* | 3/2018 | Katz | G06V 20/46 |

OTHER PUBLICATIONS

Tidbits, "iTunes 11: The Features Apple Removed, and Alternatives", Dec. 4, 2012, https://tidbits.com/2012/12/04/itunes-11-the-features-apple-removed-and-alternatives/, retrieved on Jan. 26, 2023, 6 pages.

* cited by examiner

*Primary Examiner* — Henry Orr
(74) *Attorney, Agent, or Firm* — DORITY & MANNING P.A.

(57) ABSTRACT

Systems and methods for dynamic content item display can include a dynamic carousel interface. The dynamic carousel interface can provide a plurality of content items for display in a carousel that can be navigated through to provide the different content items for display. The dynamic carousel interface can include dynamic resizing of display containers, which can be paired with dynamic masking to provide at least a portion of more content items at one time.

20 Claims, 42 Drawing Sheets

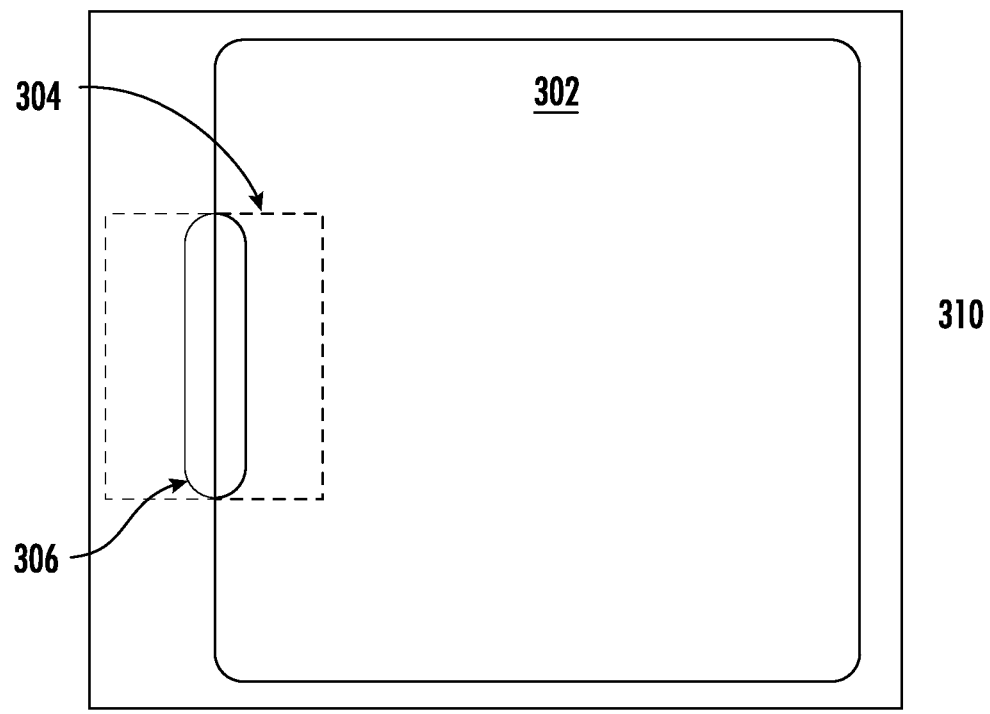
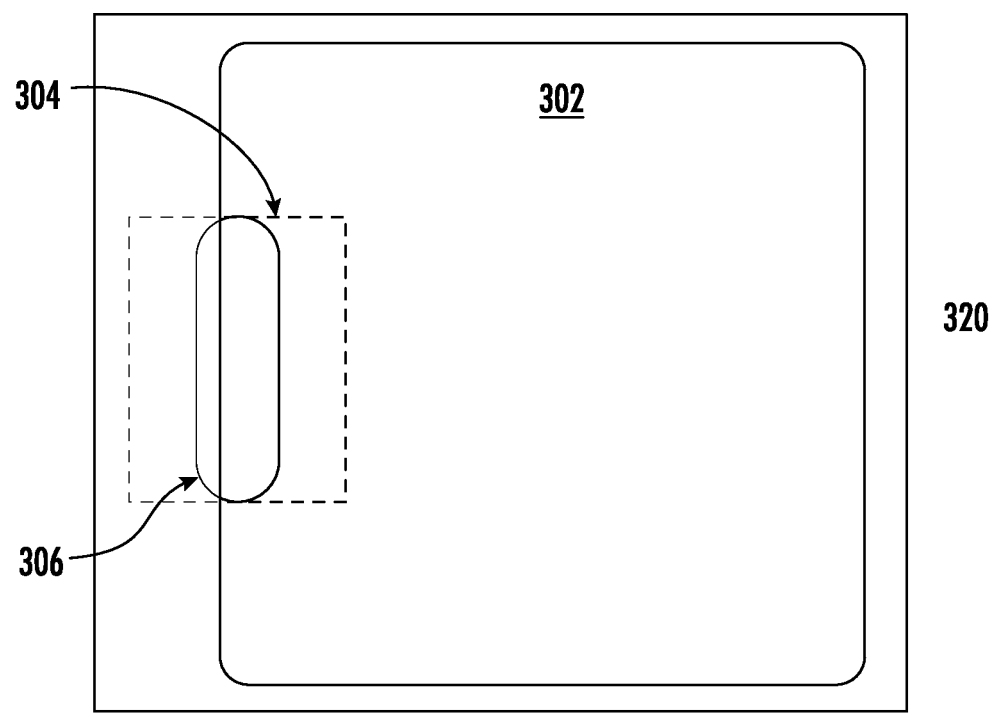
FIG. 3A

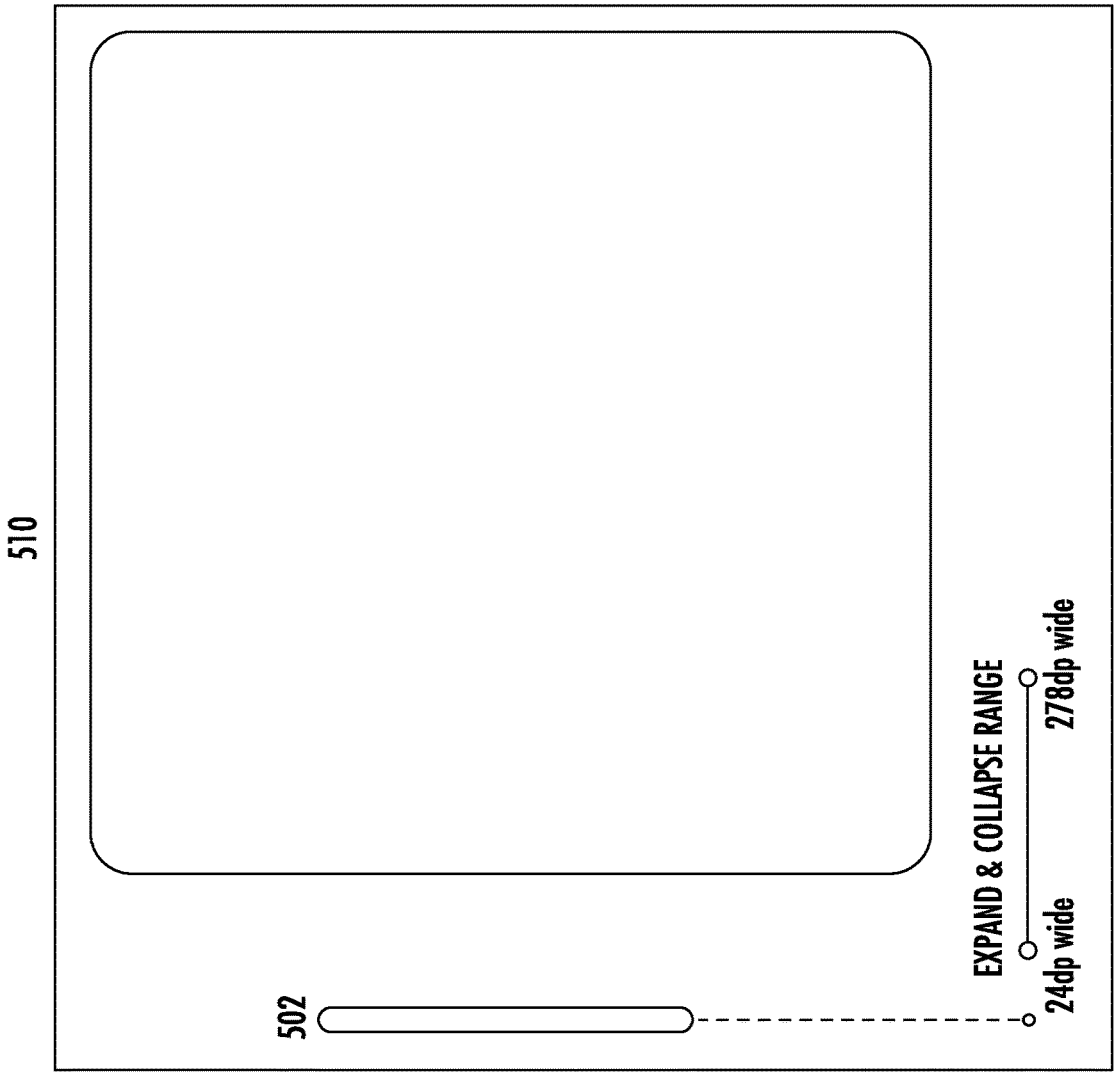

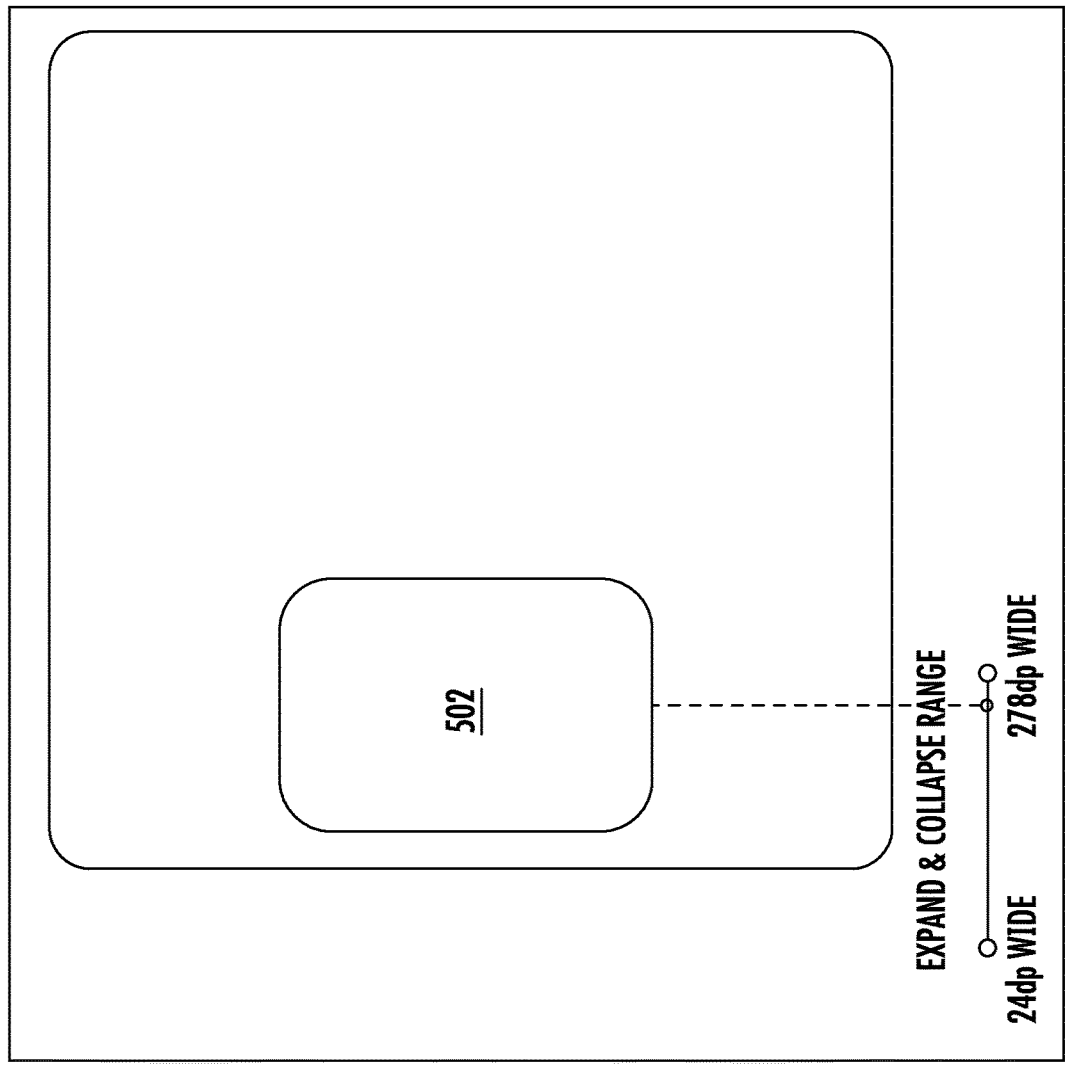

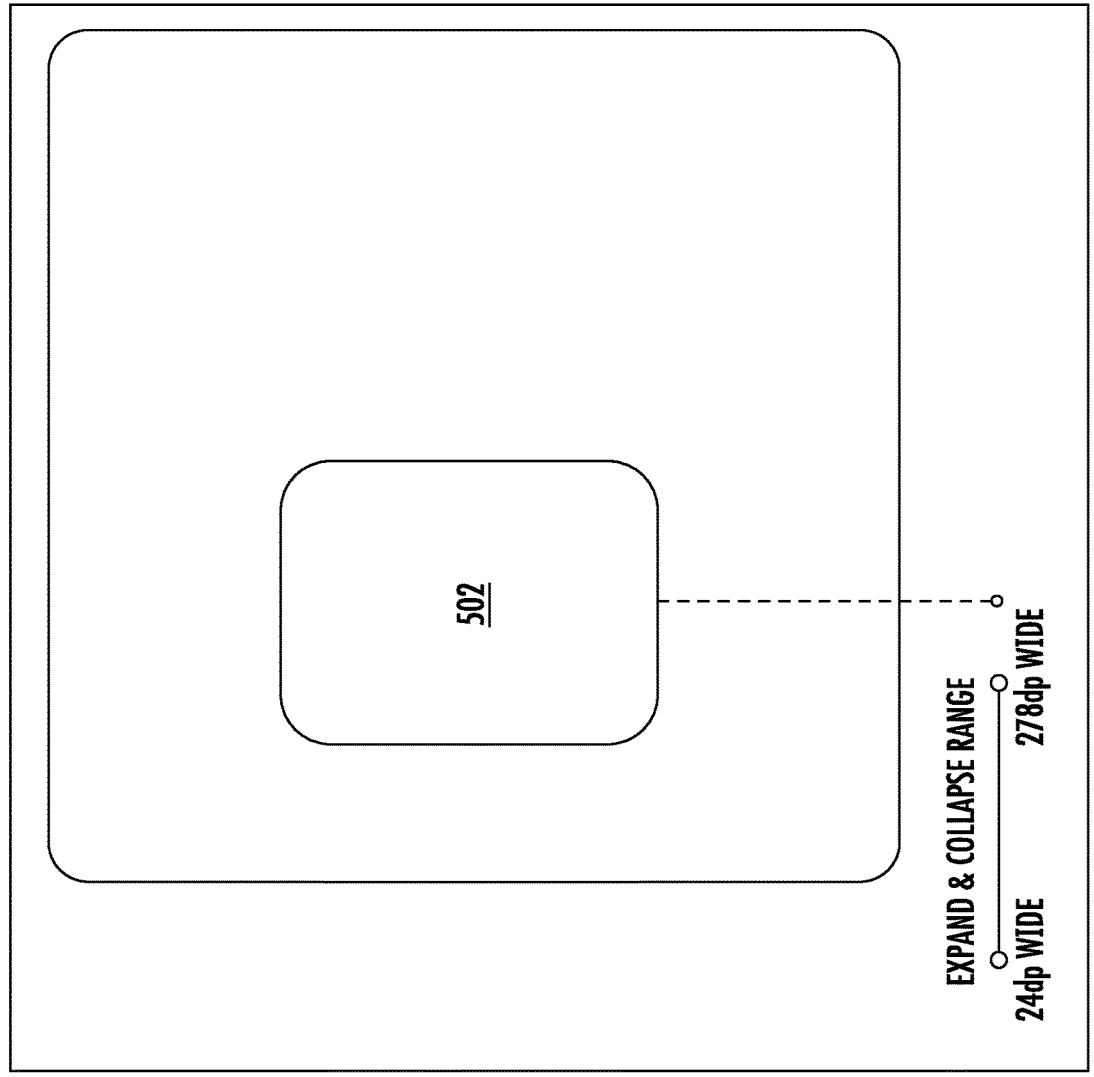

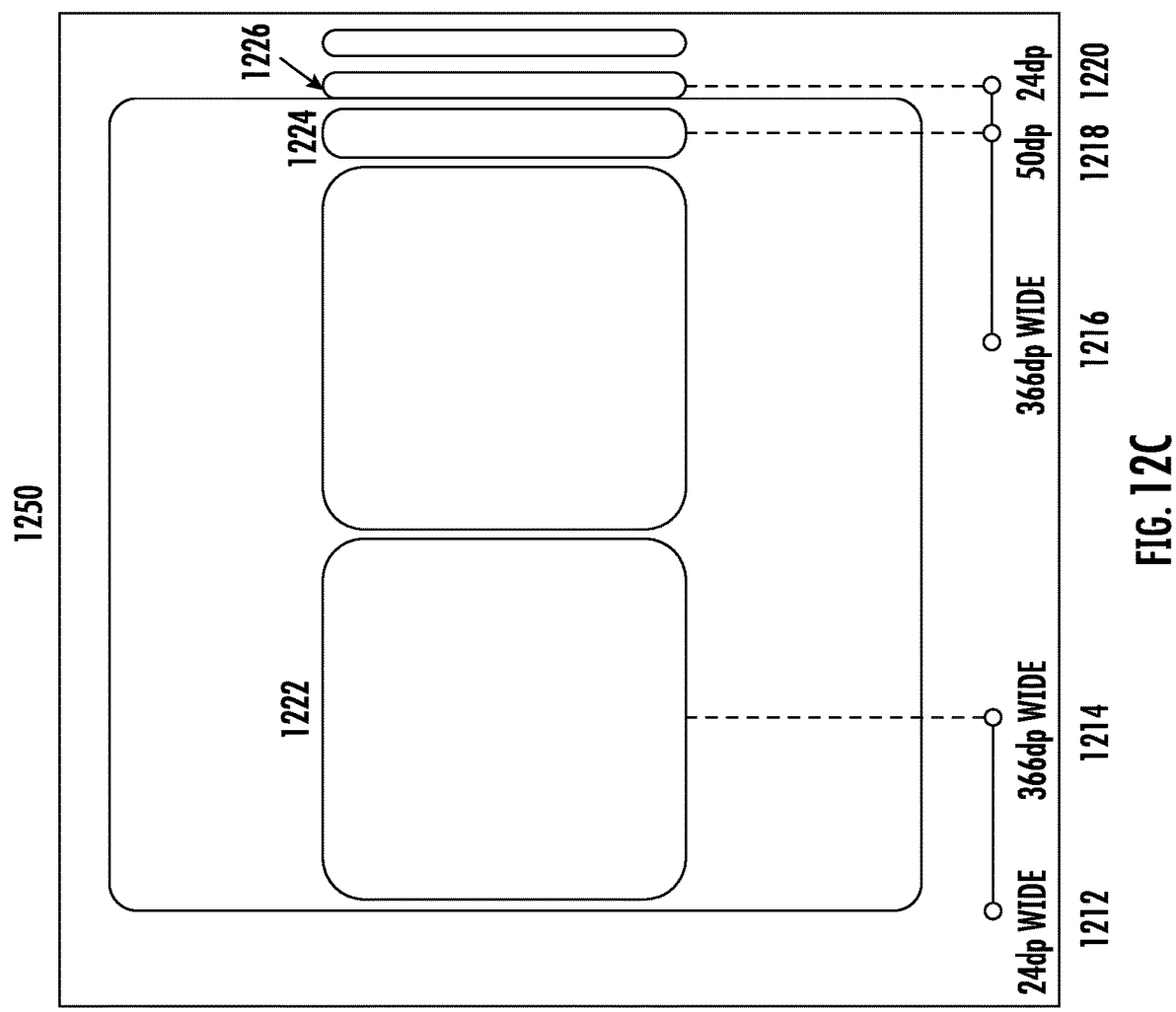

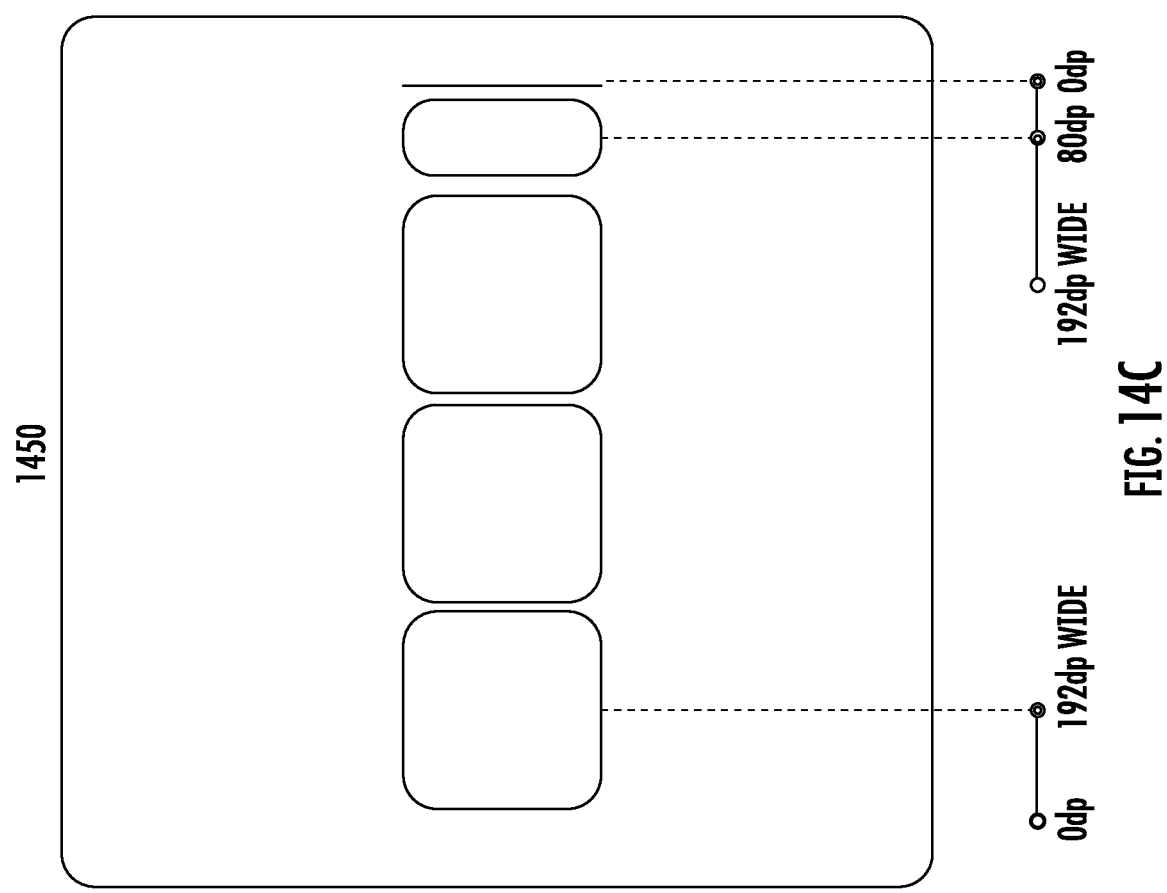

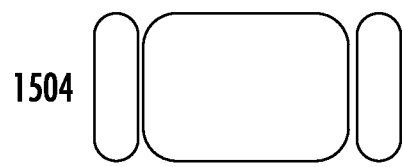
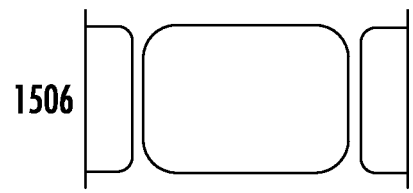
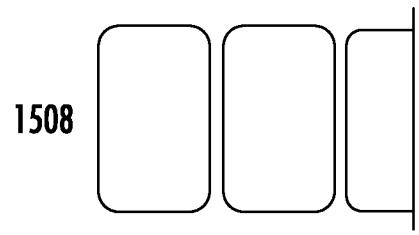
FIG. 15

2400
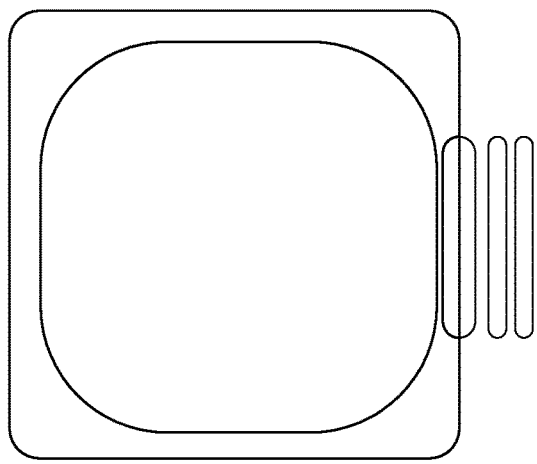
2402
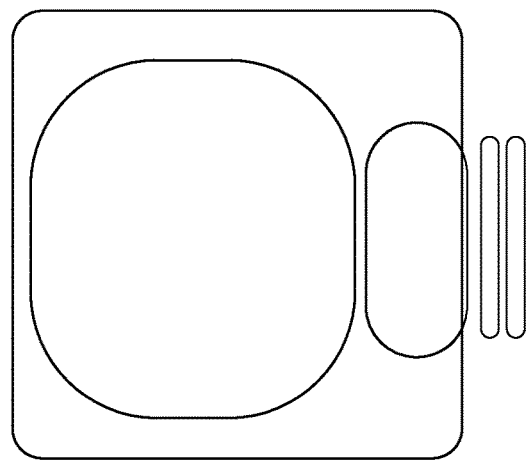
2404
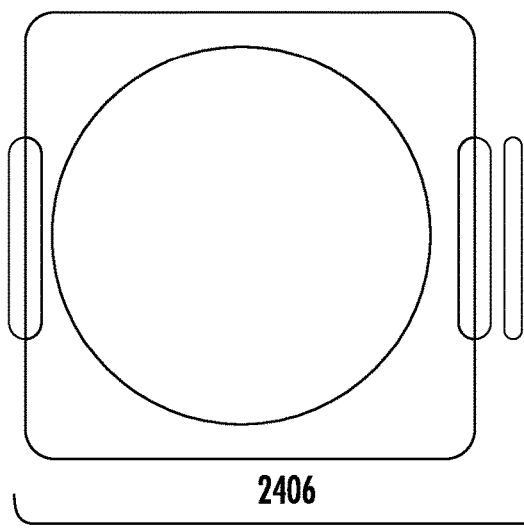
2406
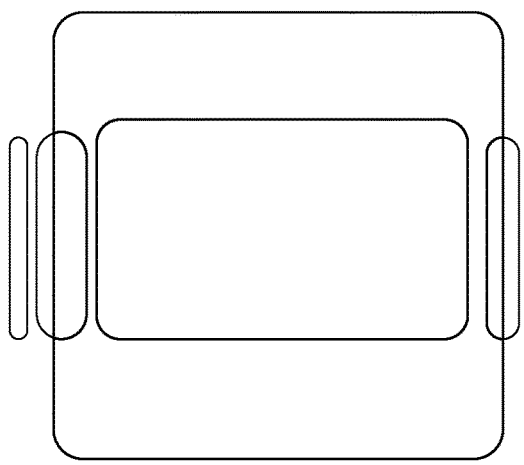
2408
FIG. 24

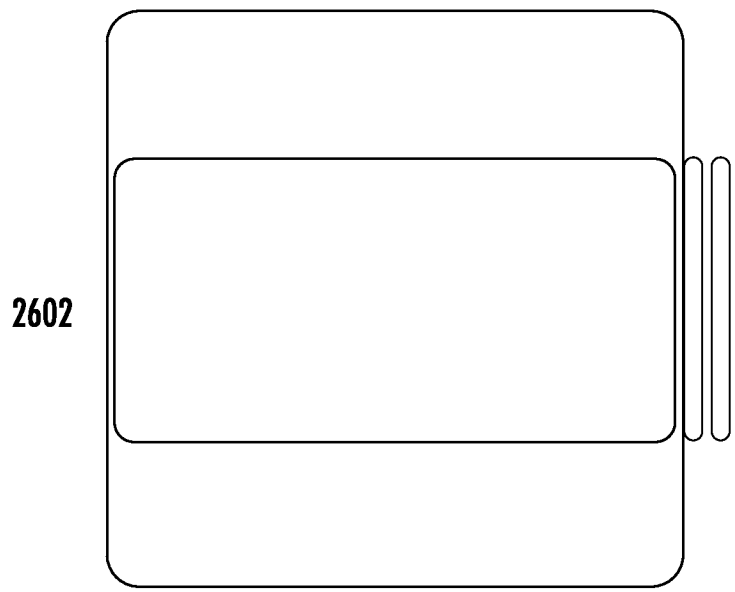
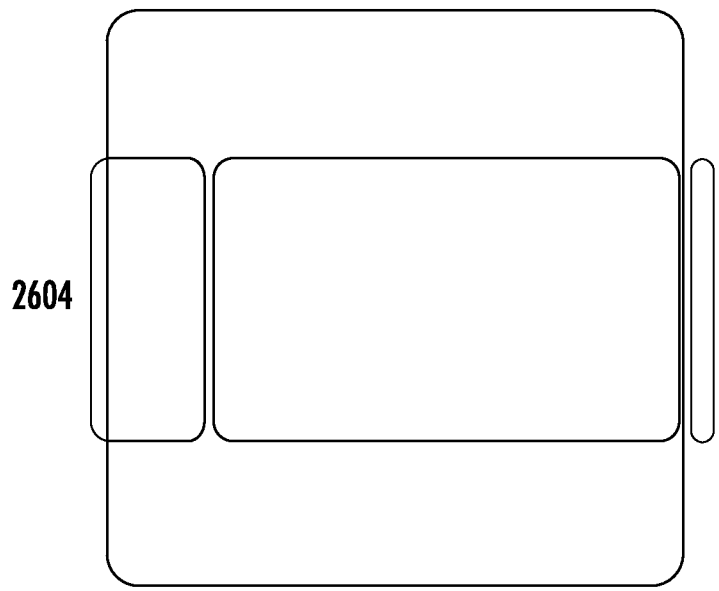
FIG. 26

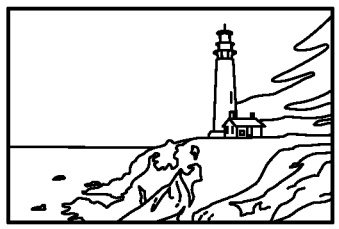
ORIGINAL 2702
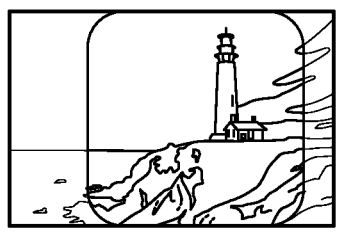
SQUARE - CONTEXTUAL CROPPED
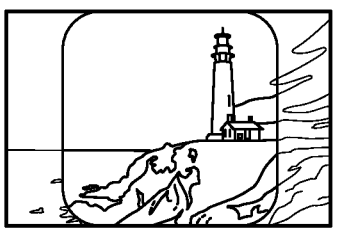
SQUARE - CENTER CROPPED
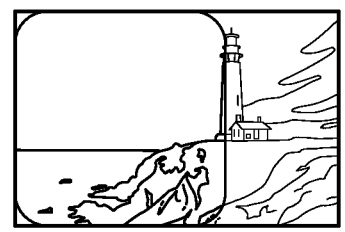
SQUARE - EDGE CROPPED
2710
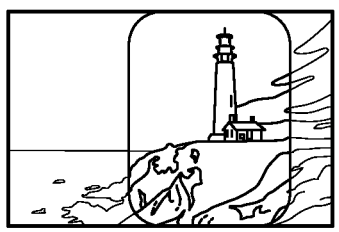
3:4 - CONTEXTUAL CROPPED
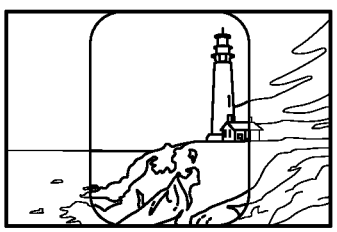
3:4 - CENTER CROPPED
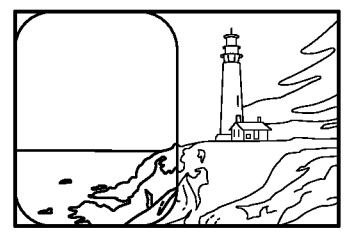
3:4 - EDGE CROPPED
2712
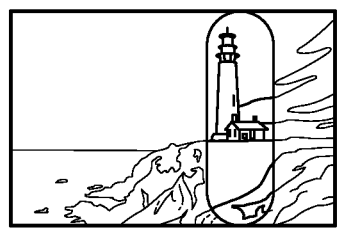
PREVIEW - CONTEXTUAL CROPPED
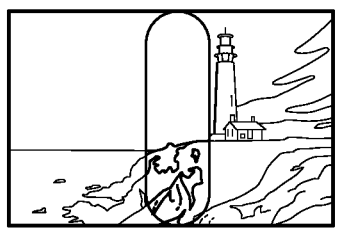
PREVIEW - CENTER CROPPED
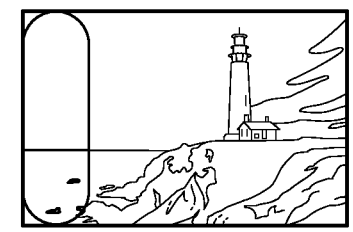
PREVIEW - EDGE CROPPED
2714
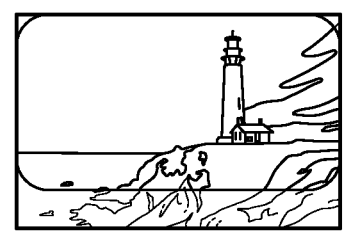
16:9 - CONTEXTUAL CROPPED
2704
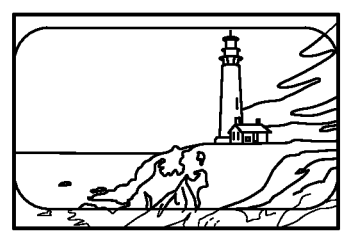
16:9 - CENTER CROPPED
2706
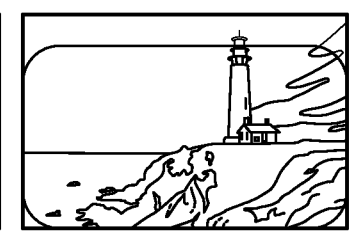
16:9 - EDGE CROPPED
2708
2716
FIG. 27

DYNAMIC CAROUSEL INTERFACE

RELATED APPLICATIONS

This application claims priority to and the benefit of U.S. Provisional Patent Application No. 63/396,242, filed Aug. 9, 2022. U.S. Provisional Patent Application No. 63/396,242 is hereby incorporated by reference in its entirety.

FIELD

The present disclosure relates generally to a dynamic carousel interface for displaying content items. More particularly, the present disclosure relates to the dynamic adjustment of display container sizes and masking percentages for content items to provide an interface that provides previews for some content items, while allowing the display of expanded views.

BACKGROUND

The screen size of smart devices can be limited, which can limit the number of content items that can be displayed at one time. Additionally, the previewing of content items can be rigid and can provide little to no insight on the semantics of the content item as a whole. Some methods for displaying more content items can include shrinking the content items to the point where the actual content item is indiscernible, which can provide little to no information on what the actual content item includes.

SUMMARY

Aspects and advantages of embodiments of the present disclosure will be set forth in part in the following description, or can be learned from the description, or can be learned through practice of the embodiments.

One example aspect of the present disclosure is directed to a computing system for providing one or more content items for display. The computing system can include one or more processors and one or more non-transitory computer-readable media that collectively store instructions that, when executed by the one or more processors, cause the computing system to perform operations. The operations can include providing for display a user interface. The user interface can include a content item provided for display in a display container. In some implementations, the display container can be a first size. The content item can be displayed with a first masking level based on the first size. The first masking level can be descriptive of an amount of the content item masked to fit into the display container at the first position. The operations can include obtaining a first input. The first input can be descriptive of a navigation input to scroll through the user interface. In some implementations, the navigation input can move the display container from a first position to a second position. The operations can include providing for display an updated user interface. The updated user interface can include the content item provided for display in an updated display container of a second size. In some implementations, the second size can be smaller than the first size. The content item can be displayed with a second masking level based on the second size. The second masking level can be descriptive of an amount of the content item masked to fit into the updated display container at the second position. The second masking level can mask a larger portion of the content item than the first masking level.

Another example aspect of the present disclosure is directed to a computer-implemented method for providing one or more content items for display. The method can include providing, by a computing system including one or more processors, an initial carousel interface for display. The initial carousel interface can include a plurality of content items. The initial carousel interface can include a first content item of the plurality of content items being provided for display in a first container of a first size. In some implementations, the first container can be at a first position. The method can include obtaining, by the computing system, a navigation input. The navigation input can be associated with a navigation associated with a carousel of the initial carousel interface. The method can include providing, by the computing system, an updated carousel interface for display. In some implementations, the updated carousel interface can include the first content item of the plurality of content items being provided for display in the first container of a second size. A portion of the first content item can be masked based on the first container being the second size. The first container can be at a second position. In some implementations, the updated carousel interface can include a second content item of the plurality of content items being provided for display in a second container of the first size. The second container can be at the first position.

Another example aspect of the present disclosure is directed to one or more non-transitory computer-readable media that collectively store instructions that, when executed by one or more computing devices, cause the one or more computing devices to perform operations. The operations can include obtaining a plurality of content items and obtaining a layout setting. The layout setting can include a plurality of key lines. Each key line of the plurality of key lines can be associated with a particular container size. The operations can include determining a first content item of the plurality content items is at a first position. The first position can be associated with a first key line of the plurality of key lines. The operations can include determining a second content item of the plurality content items is at a second position. The second position can be associated with a second key line of the plurality of key lines. The operations can include determining a first size associated with the first key line and determining a second size associated with the second key line. The operations can include providing an initial carousel interface for display. In some implementations, the initial carousel interface can include a plurality of containers associated with the plurality of content items. The initial carousel interface can include at least a portion of the first content item being provided for display in a first container. The first container can be the first size. In some implementations, the initial carousel interface can include at least a portion of the second content item being provided for display in a second container. The second container can be the second size. The operations can include determining the second content item is at the first position and providing an updated carousel interface. The updated carousel interface can include the second content item being provided for display in the second container. In some implementations, the second container can be the first size.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-3B depict a block diagram of an example container size adjustment according to example embodiments of the present disclosure.

FIGS. 5A-5C depict illustrations of an example display container transition according to example embodiments of the present disclosure.

FIGS. 12A-12C depict a block diagram of an example container size transition according to example embodiments of the present disclosure.

FIGS. 14A-14C depict a block diagram of an example container size transition according to example embodiments of the present disclosure.

FIG. 15 depicts a block diagram of example display layouts according to example embodiments of the present disclosure.

FIG. 24 depicts a block diagram of an example shape compression transition according to example embodiments of the present disclosure.

FIG. 26 depicts a block diagram of an example container transition according to example embodiments of the present disclosure.

FIG. 27 depicts an illustration of example image container collapses according to example embodiments of the present disclosure.

Figure 1A:
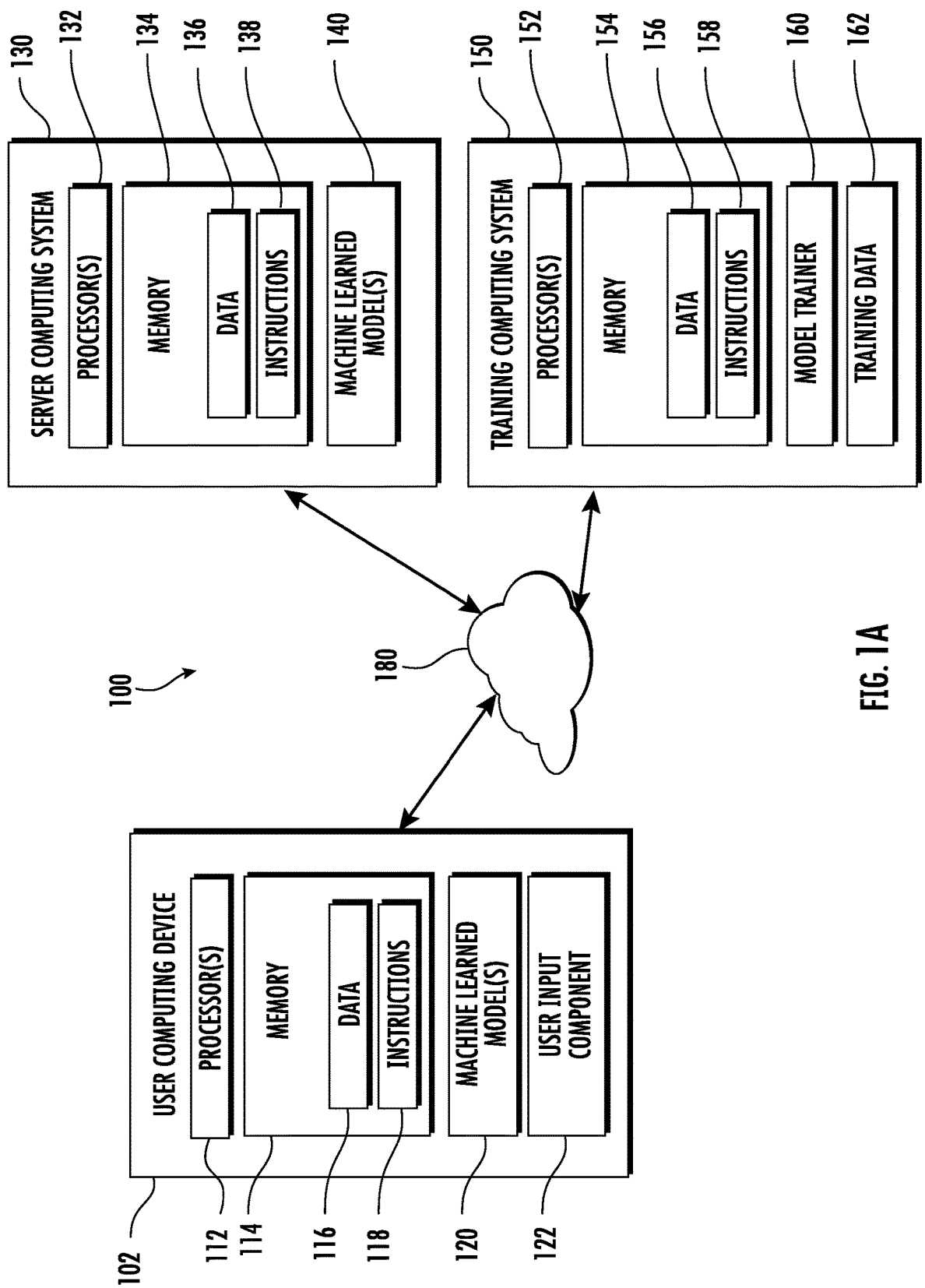
FIG. 1A depicts a block diagram of an example computing system that performs dynamic display according to example embodiments of the present disclosure.

Reference numerals that are repeated across plural figures are intended to identify the same features in various implementations.

DETAILED DESCRIPTION

Overview

Generally, the present disclosure is directed to systems and methods for displaying content items in a dynamic format. In particular, the systems and methods disclosed herein can leverage a dynamic carousel to provide informative previews and larger portions in an interactive carousel such that the content item previews grow and collapse as they move across the display. For example, the systems and methods can include providing for display a user interface. The user interface can include a content item provided for display in a display container. The display container can be a first size. In some implementations, the content item can be displayed with a first masking level. The systems and methods can include obtaining a first input. The first input can be descriptive of a navigation input to scroll through a carousel interface. In some implementations, the navigation input can move the display container from a first position to a second position. The systems and methods can include providing for display an updated user interface. The updated user interface can include the content item provided for display in an updated display container of a second size. In some implementations, the second size can be smaller than the first size. The content item can be displayed with a second masking level. The second masking level can mask a larger portion of the content item than the first masking level. The transition from the first size with the first masking level to the second size with the second masking level can be contextually-adaptive based on the content of the content item (e.g., the masking and/or the content in the container may be determined based on a context associated with the content item (e.g., a focal point in an image (e.g., a foreground object) and/or the topic or core concept of a set of text in the content item). The context may be determined based on processing the content item with one or more machine-learned models, may be determined based on content item metadata, and/or may be based on one or more heuristics.

The systems and methods disclosed herein can be utilized to enable a dynamic carousel interface. The carousel can be implemented in a variety of formats with the different formats providing different amounts of display of different content items at different positions. The systems and methods can be leveraged to fit more content items in a display of a user interface without crowding the display. The dynamic carousel interface can provide one or more content items at a full or close to full display size while providing one or more additional content items for display in smaller containers with a portion of the additional content items masked. The content items being displayed at full size and the content items that are at least partially masked can change as the content items move throughout the carousel. The display interface can therefore provide more content items on the screen while still providing focus in full visibility on one or more content items. The dynamic carousel interface can be utilized to provide an informative display for devices with limited screen size (e.g., mobile devices including smartphones, tablets, smart wearables (e.g., smart glasses, smart watches, etc.), and/or appliances (e.g., smart fridges, thermostats, etc.). Additionally and/or alternatively, the systems and methods can be utilized for larger display implementations (e.g., television applications or programming, content being shared via a projector or a smart whiteboard, and/or jumbotrons (e.g., jumbotrons in event venues for sports or performances)) to provide an informative display with a dynamic display of content items. The display screen for displaying the dynamic carousel interface can be hardware and/or virtual.

The dynamic carousel interface can include displaying a plurality of content items in a plurality of respective containers. The containers can expand and collapse in size as the carousel is navigated through. In response, the amount of masking of the content items can fluctuate in an inverse proportion such that as the container expands, the masking of the respective content item can decrease and vice versa. The adjustment of container sizes can occur with respect to the position of the content item (and in turn the display container) within the display interface. For example, one position of the display interface may be associated with a large display position, while another position of the display interface may be associated with a collapsed display position.

The systems and methods can provide for display a user interface. The user interface can include a content item (e.g., an image, a video, text, and/or a multimodal content item (e.g., text and an image)) provided for display in a display container. In some implementations, the display container can be a first size. The content item can be displayed with a first masking level. The first masking level can be based on the display container being the first size. In some implementations, the first masking level can be descriptive of an amount of the content item masked to fit into the display container at the first position. The first size can be based at least in part on a screen size of the computing device. Alternatively and/or additionally, the first size may be the same size regardless of the screen size. In some implementations, the number of content items provided for display at a single time may be determined based on screen size, carousel format, and/or user settings.

A first input can then be obtained. The first input can be descriptive of a navigation input to scroll through a carousel interface. In some implementations, the navigation input can move the display container from a first position to a second position. The first input can include a swipe gesture, a selection of a navigation element, and/or an input triggered by the passing of a particular period of time (e.g., a predetermined threshold period of time). The movement of the display container can include the movement of the content item. Additionally and/or alternatively, the movement can be a linear movement (e.g., a horizontal movement about an x-axis, a vertical movement about a y-axis, and/or a diagonal movement about an x=y line, etc.). The movement can be determined based on a center of the display container. The display container can consistently and/or progressively change in size as the movement occurs.

An updated user interface can then be provided for display. The updated user interface can include the content item being provided for display in an updated display container of a second size. In some implementations, the second size can be smaller than the first size. Additionally and/or alternatively, the content item can be displayed with a second masking level. The second masking level can be based on the display container being the second size. The second masking level can mask a larger portion of the content item than the first masking level. In some implementations, the second masking level can be descriptive of an amount of the content item masked to fit into the updated display container at the second position. The second size can be based at least in part on a screen size of the computing device. Alternatively and/or additionally, the second size may be the same size regardless of the screen size. The updated user interface can include a same (e.g., matching or substantially similar to) format as the initial user interface with different containers being displayed at the different respective sizes of the layout. For example, the display container may change from a first size to a second size, while the updated user interface may include a second display container being the first size.

In some implementations, the systems and methods can include determining the navigation input moves the display container from a first key line (e.g., a first position associated with a first size in a layout configuration for the graphical user interface) to a second key line (e.g., a second position associated with a second size in a layout configuration for the graphical user interface) and determining a scaling transition based on the first key line and the second key line. The scaling transition can include a progressive change of a size of the display container from a first size to the second size. In some implementations, the systems and methods can include causing the scaling transition to occur as the display container travels from the first position to the second position. The first key line can be associated with the first position. Additionally and/or alternatively, the first key line can be associated with the first size. The second key line can be associated with the second position. The second key line can be associated with the second size.

In some implementations, the scaling transition can include adjusting a display container size proportional to a difference between the first size and the second size. Additionally and/or alternatively, the scaling transition can include adjusting a mask level proportional to a difference between the first mask level and the second mask level.

In some implementations, the systems and methods can include determining the display container is at a third position. The third position can be between the first position and the second position. An intermediate user interface can then be provided for display. The intermediate user interface can include the content item provided for display in an intermediate display container of a third size. The third size can be smaller than the first size. In some implementations, the third size can be larger than the second size.

Alternatively and/or additionally, the systems and methods can include determining a focal point of the content item and determining a portion of the content item to mask based on the focal point. Determining the focal point of the content item can include processing the content item with a first machine-learned model to generate one or more object detection outputs and processing the one or more object detection outputs with a second machine-learned model to generate a focal point classification. The focal point classification can be descriptive of a semantic intent of a content item (e.g., a foreground object in an image). The masking can be performed such that the focal point stays visible even as the display container collapses.

The dynamic carousel interface can be utilized to provide a plurality of content items for display simultaneously with the content items being displayed at different sizes while at different positions. The systems and methods can include providing an initial carousel interface for display. The initial carousel interface can include a plurality of content items. In some implementations, the initial carousel interface can include a first content item of the plurality of content items being provided for display in a first container of a first size. The first container can be at a first position. The systems and methods can include obtaining a navigation input. The navigation input can be associated with a navigation associated with a carousel of the initial carousel interface. The systems and methods can include providing an updated carousel interface for display. The updated carousel interface can include the first content item of the plurality of content items being provided for display in the first container of a second size. In some implementations, a portion of the first content item can be masked based on the first container being the second size. The first container can be at a second position. Additionally and/or alternatively, the updated carousel interface can include a second content item of the plurality of content items being provided for display in a second container of the first size. The second container can be at the first position.

The systems and methods can provide an initial carousel interface for display. The initial carousel interface can include a plurality of content items. The initial carousel interface can include a first content item of the plurality of content items being provided for display in a first container of a first size. In some implementations, the first container can be at a first position. Additionally and/or alternatively, the first content item can include a multimodal content item. The multimodal content item can include an image and a first set of text. In some implementations, the initial carousel interface can include a second content item and a third content item. The second content item of the plurality of content items can be provided for display in a second container, and the third content item of the plurality of content items can be provided for display in a third container of a third size. The second container can be at a second position. The third container can be at a third position. The first position can be associated with a first key line, and the second line can be associated with a second position. Additionally and/or alternatively, the first key line can be associated with the first size such that the display container can be a first size when coinciding with the first key line, and the second key line can be associated with the second size such that the display container can be a second size when coinciding with the second key line.

A navigation input can then be obtained. The navigation input can be associated with a navigation associated with a carousel of the initial carousel interface. The navigation input can be descriptive of a gesture and/or a selection received via a touchscreen. In some implementations, the navigation can scroll through the content items of the carousel. Alternatively and/or additionally, the navigation input can be obtained based on one or more user interactions (e.g., a button compression, a gesture, a touchscreen interaction, a voice command, etc.) with an input device (e.g., a mouse, a remote controller, a keyboard, and/or an input sensor (e.g., an image sensor for tracking a user gaze or an audio sensor for voice commands)) associated with a computing system.

An updated carousel interface can then be provided for display. The updated carousel interface can include the first content item of the plurality of content items being provided for display in the first container of a second size. In some implementations, a portion of the first content item can be masked based on the first container being the second size. The first container can be at a second position. Additionally and/or alternatively, the updated carousel interface can include a second content item of the plurality of content items being provided for display in a second container of the first size. The second container can be at the first position. The change of the first container from the first size to the second size may be a progressive change such that as the container reaches a halfway position between the first position and the second position, the first container may be halfway through the transition from the first size to the second size.

In some implementations, the systems and methods can include the text of the content item changing based on the size of the container. For example, the content item may have a first set of text when displayed in full size. The systems and methods can then include determining the second size is below a size threshold and obtaining a second set of text. The updated carousel interface can include the first content item including a portion of the image and the second set of text. The second set of text can include less characters than the first set of text. In some implementations, the first set of text and the second set of text can be descriptive of the same or substantially similar information with the first set of text and the second set of text being in different formats (e.g., the first set of text can include "New Year's Day, Jan. 1, 2022," the second set of text can include "Jan. 1, 2022," and, in instances of a third set of text associated with a second size threshold, the third set of text may include "1/1/21"). Alternatively and/or additionally, the second set of text can include a portion of the information provided by the first set of text (e.g., the first set of text can include "Jul. 1, 2021," the second set of text can include "Last Year," and, in instances of a third set of text associated with a second size threshold, the third set of text may include "2021"). The second set of text and/or any additional sets of text for use during resizing (e.g., a third set of text associated with a second size threshold) may be input and stored in association with the respective content item. Alternatively and/or additionally, the additional sets of text (e.g., the second set of text and/or the third set of text) can be generated by processing the first set of text with one or more machine-learned models. In some implementations, the additional sets of text (e.g., the second set of text and/or the third set of text) can be generated based on one or more heuristics. In some implementations, the first set of text can include a title and a descriptive description, and the second set of text can include the title and/or one or more keywords associated with the topic of the description.

Additionally and/or alternatively, the systems and methods can include obtaining display size data associated with a particular display device. The display size data can be descriptive of a display size for the particular display device. In some implementations, the first size and the second size can be based at least in part on the display size data.

Alternatively and/or additionally, the systems and methods can include obtaining a plurality of content items and obtaining a layout setting. The layout setting can include a plurality of key lines. In some implementations, each key line of the plurality of key lines can be associated with a particular container size. The systems and methods can include determining a first content item of the plurality content items is at a first position. The first position can be associated with a first key line of the plurality of key lines. In some implementations, the systems and methods can include determining a second content item of the plurality content items is at a second position. The second position can be associated with a second key line of the plurality of key lines. Additionally and/or alternatively, the systems and methods can include determining a first size associated with the first key line and determining a second size associated with the second key line. An initial carousel interface can be provided for display. The initial carousel interface can include a plurality of containers associated with the plurality of content items. In some implementations, the initial carousel interface can include at least a portion of the first content item being provided for display in a first container. The first container can be the first size. Additionally and/or alternatively, the initial carousel interface can include at least a portion of the second content item being provided for display in a second container. The second container can be the second size. The systems and methods can determine the second content item is at the first position. The systems and methods can include providing an updated carousel interface. The updated carousel interface can include the second content item being provided for display in the second container. In some implementations, the second container can be the first size.

The systems and methods can obtain a plurality of content items. The plurality of content items can include a plurality of images. Alternatively and/or additionally, the plurality of content items can include one or more multimodal content items, which can include image data and text data. In some implementations, the plurality of content items can include one or more image content items, one or more video content items, one or more audio content items, one or more multimodal content items, and/or one or more other content items. The plurality of content items can be obtained based on a search query in which the plurality of content items are responsive to the search query. Alternatively and/or additionally, the plurality of content items can be obtained from a database based on a plurality of content items selected and/or generated by a third party computing system.

A layout setting can then be obtained. The layout setting can include a plurality of key lines. In some implementations, each key line of the plurality of key lines can be associated with a particular container size. The plurality of key lines may be determined based on one or more selections by a third party computing system. Alternatively and/or additionally, the plurality of key lines may be pre-determined. In some implementations, the plurality of key lines can differ between a first layout setting and a second layout setting.

A first content item of the plurality content items can be determined to be at a first position. The first position can be associated with a first key line of the plurality of key lines. The first content item can include a first image.

A second content item of the plurality content items can be determined to be at a second position. The second position can be associated with a second key line of the plurality of key lines. The second content item can include a second image.

The systems and methods can determine a first size associated with the first key line. The first size can be a container size that displays all or almost all of the content item with little to no masking.

Additionally and/or alternatively, the systems and methods can determine a second size associated with the second key line. The second size can be a container size that displays a portion of the content item with at least a portion of the content item being masked. The second size can be two times the radius of a corner curve of the display container.

An initial carousel interface can then be provided for display. The initial carousel interface can include a plurality of containers associated with the plurality of content items. In some implementations, the initial carousel interface can include a portion of the first content item being provided for display in a first container. The first container can be the first size. Additionally and/or alternatively, the initial carousel interface can include a portion of the second content item being provided for display in a second container. The second container can be the second size. In some implementations, the second size can be based at least in part on a determined width of a container corner. Additionally and/or alternatively, the initial carousel interface may include a plurality of display containers of the first size.

The systems and methods can then determine the second content item is at the first position. The determination can be triggered in response to a user input that causes the carousel to rotate the positions of the content items.

An updated carousel interface can then be provided for display. The updated carousel interface can include the second content item being provided for display in the second container. The second container can be the first size. In some implementations, the updated carousel interface can include a plurality of display containers of the first size. In some implementations, the updated carousel interface can include the first content item being provided in the first container in which the first container is a second size. The transition from the first size to the second size can be based on the width of the full size container state versus the width of the collapsed container state.

The systems and methods can include a developer interface for customizing the dynamic carousel interface to be viewed by one or more users (or clients). The systems and methods can obtain a developer input via the developer interface. The developer input can be descriptive of a desired content item size of display. In some implementations, the developer can input a desired size vertically and horizontally for the content items. The developer may be able to select the minimum size (e.g., collapsed size) and the maximum size (e.g., full size) of the containers when navigated through in the dynamic carousel interface. In some implementations, the developer can select the positions of one or more key lines and can set the container size at each of the key lines.

The number of content items displayed can be determined based on one or more selections to the developer interface.

In some implementations, the developer interface can provide an interface for generating a list of content items. The developer can select a horizontal list, a vertical list, and/or another orientation for displaying the list of content items. The developer interface can then utilize a carousel layout manager to automatically set key lines and/or receive selections for setting user-selected key lines. The developer can select a variant type, an alignment (center, right, left, bottom, etc.), whether the content items "bleed" over the edge of a screen (e.g., the display container is displayed as being intersected by the edge of the screen), and/or a template key line layout (e.g., a hero template (e.g., a single expanded container and multiple collapsed containers), a multi-browse template (e.g., multiple expanded containers of the same size and one or more collapsed containers).

In some implementations, the position and number of key lines along with the corresponding container sizes can be utilized to determine a rate of change for the container sizes and/or the masking. For example, a rate of change can be the difference in size of container over the difference in position.

In some implementations, one or more layout templates can be provided to the developer via the developer interface to provide pre-built options.

The mask can be defined by a desired size of a key window (e.g., a developer can decide how big they want the biggest item and how big they want the smallest item to be).

The dynamic carousel interface can be implemented in a variety of different environments or web platforms. For example, the dynamic carousel interface can be generated based on a plurality of search results responsive to a search query. The dynamic carousel interface can then be provided in a search results page. In some implementations, the dynamic carousel interface can be utilized in map applications for the suggested locations, the images associated with a particular location, feature options (e.g., street view, pinned locations, home), and/or route options (e.g., selecting between routes and/or turn-by-turn directions). Additionally and/or alternatively, document managers and/or other content item managers may utilize the systems and methods disclosed herein to provide dynamic previews of the different content items while navigating through a catalog of content items. In some implementations, the dynamic carousel interface can be utilized to provide cards (e.g., representation depictions) associated with streaming content items for display in a user interface of a streaming application (e.g., a music streaming application and/or a video streaming application). The dynamic carousel interface can be utilized for a television main page, smart device control panels or content item view (e.g., workout metric display for a smart watch, and/or setting panels for a smart thermostat), electronic reader library interfaces, wallpaper selection interfaces, notification interfaces, media player interfaces, discovery feed interfaces, album carousels, story interface carousels, presentation slide thumbnails, news carousels, console analytic cards, promotional carousels, attachment displays for emails, search result pages, and/or widget interfaces.

Alternatively and/or additionally, the dynamic carousel interface can be provided in an image gallery application such that the plurality of content items are stored images in the gallery. In some implementations, the dynamic carousel interface can be provided in a user interface of a streaming application to provide display cards for different possible streaming media. In some implementations, the dynamic carousel interface can be provided in order to provide options for an application that controls smart devices (e.g., the application can include a plurality of cards associated with a plurality of different functions that can be utilized to control smart devices (e.g., smart cameras, smart thermostats, smart lights, etc.)). Additionally and/or alternatively, the systems and methods disclosed herein can be utilized to provide a dynamic carousel interface in a plurality of different applications associated with a plurality of different services or tasks. In some implementations, the systems and methods can be utilized to provide a compact display for smart wearables (e.g., smart watches).

In some implementations, an action may be associated with one or more particular key lines. For example, a dynamic image or a video may be changed to play mode when at a particular key line. Additionally and/or alternatively, different frames of the dynamic image or different frames of the video may be provided for display at different key lines.

Keylines for different screen sizes may be based on a fully expanded size of a display container for a content item and/or a corner radius of the display container. For example, a collapsed state display container may be a pill shape that is two corner radii wide with the same or similar height to the fully expanded container.

The systems and methods of the present disclosure provide a number of technical effects and benefits. As one example, the system and methods can provide a dynamic carousel interface that provides more content items for display without overcrowding. In particular, the systems and methods disclosed herein can utilize the resizing of containers and the dynamic masking of the content items to provide an interface that balances providing more content items without overcrowding or over compression. Additionally and/or alternatively, the systems and methods can allow for seamless scrolling to provide full content items for display when in particular positions in the interface while providing previews at other positions.

Another technical benefit of the systems and methods of the present disclosure is the ability to leverage one or more machine-learned models to understand content item semantics to provide informative collapsed previews. For example, the systems and methods can determine the semantics of a content item (e.g., a focal point, an object of interest, a summary of text, and/or a frame of interest and a point of interest in the frame). For example, the systems and methods can process the content item with one or more machine-learned models to determine a portion of the content item which is indicative of the overall theme or semantics of the content item, and the systems and methods can then tailor the masking of the content item to continuously provide the portion for display (e.g., smart cropping).

Another example of technical effect and benefit relates to improved computational efficiency and improvements in the functioning of a computing system. For example, the systems and methods disclosed herein can leverage the dynamic carousel interface to mitigate the amount of navigation and scrolling to provide content items for display, which can reduce the number of inputs and the number of processing iterations to view a full catalog of content items in a carousel.

With reference now to the Figures, example embodiments of the present disclosure will be discussed in further detail.

Example Devices and Systems

FIG. 1A depicts a block diagram of an example computing system 100 that performs display of a dynamic carousel interface according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 2-8.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel smart cropping across multiple instances of masking of content items).

More particularly, the systems and methods can include one or more machine-learned models, which can include one or more semantic models, one or more object detection models, and/or one or more summarization models. The one or more semantics models can determine a point of interest in the content item, and the systems and methods can mask based on the determined point of interest. For example, the point of interest can be a determined foreground object and/or can be a determined focal point of the content item. The masking can then be performed such that the point of interest is not masked.

The one or more object detection models can process the content item to determine one or more objects in a content item and can then determine an exemplary object and/or can determine a foreground object. The cropping can then be performed in part based on the determination.

Alternatively and/or additionally, the one or more summarization models can process a content item and can output a condensed content item and/or a summary of the content item. In some implementations, the content item can be a multimodal content item. The text of the multimodal content item can be processed to output a summary, which can then be provided when the container of the content item is collapsed.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a smart cropping service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-8.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected.

The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, training image data, training text data, training video data, ground truth labels, ground truth summaries, ground truth masks, and/or ground truth bounding boxes.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
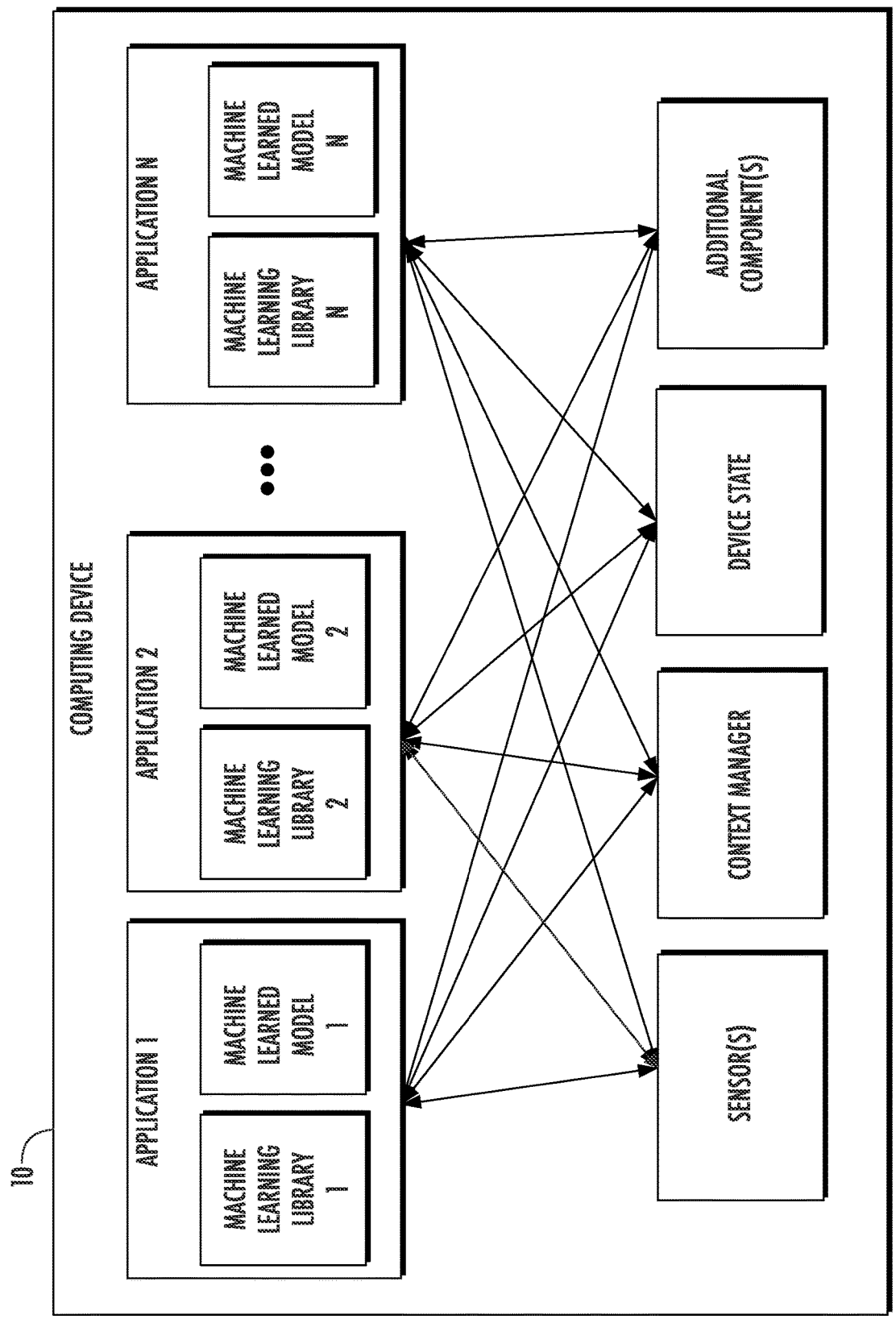
FIG. 1B depicts a block diagram of an example computing system that performs dynamic display according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
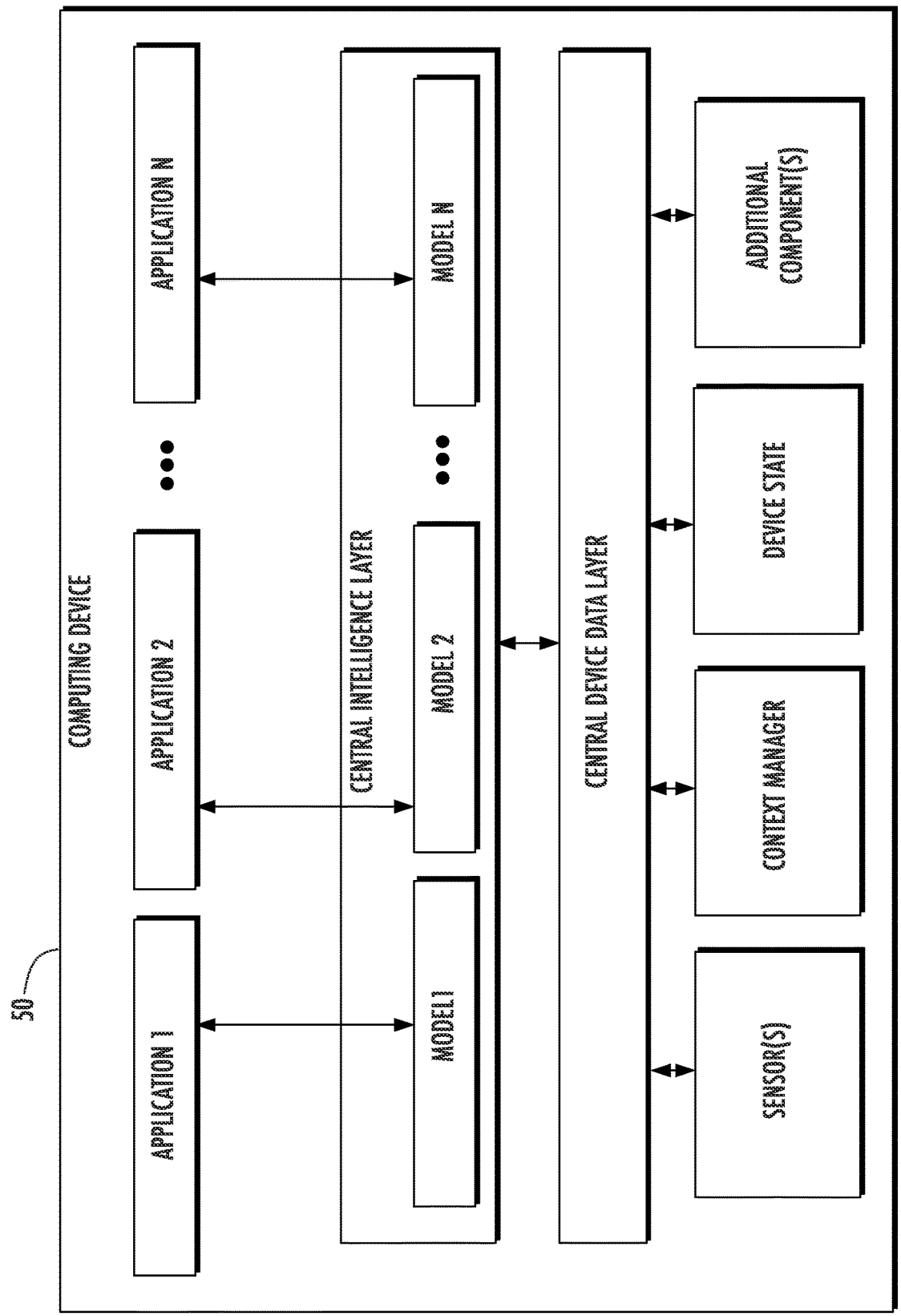
FIG. 1C depicts a block diagram of an example computing system that performs dynamic display according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 9:
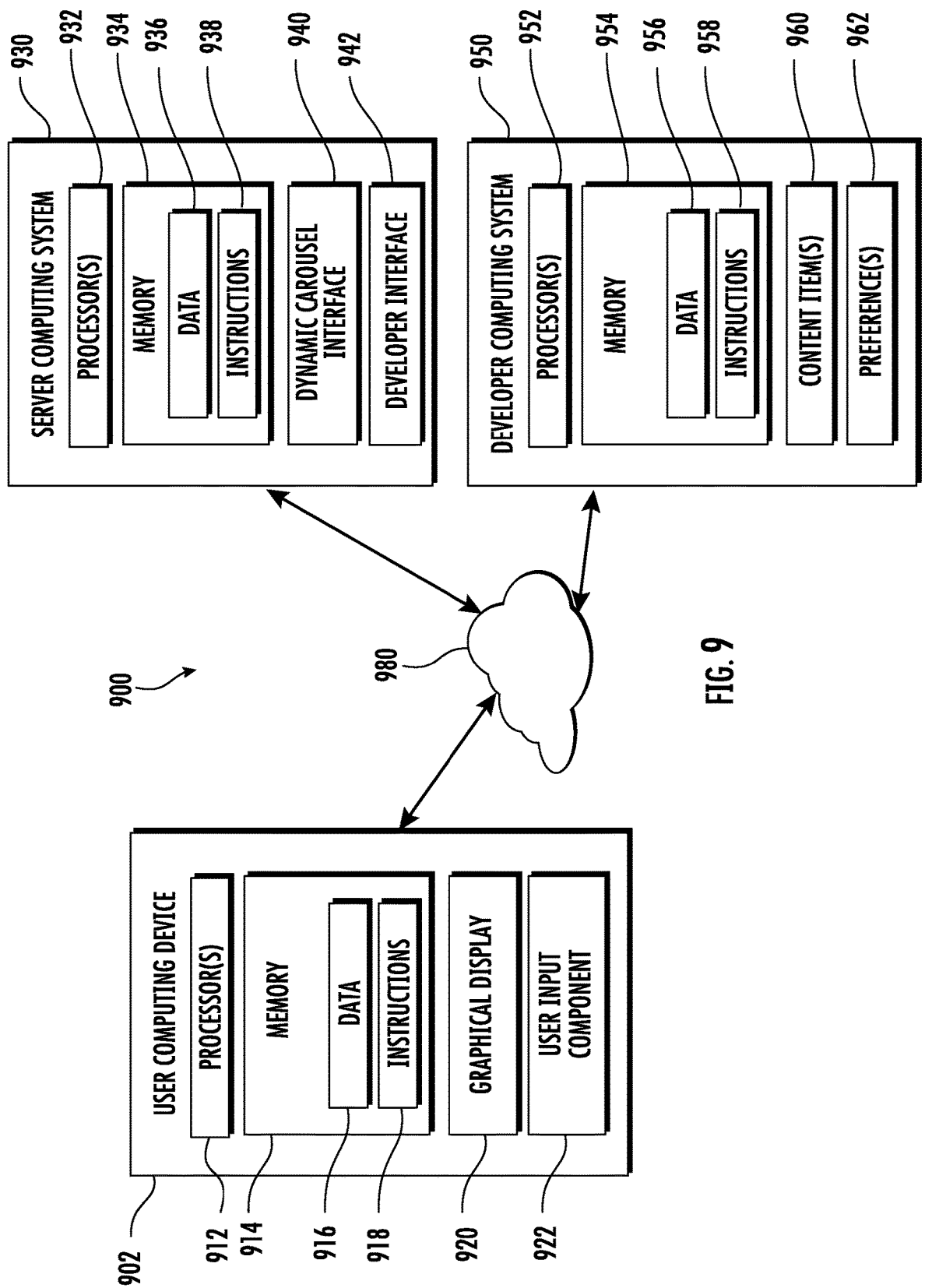
FIG. 9 depicts a block diagram of an example computing system that performs dynamic display according to example embodiments of the present disclosure.

FIG. 9 depicts a block diagram of an example computing system 900 that performs display of a dynamic carousel interface according to example embodiments of the present disclosure. The example computing system 900 can include one or more user computing devices 902 that is communicatively connected to one or more server computing systems 930 via a network 980. Additionally and/or alternatively, the example computing system 900 can include one or more developer computing systems 950 communicatively connected to the server computing system 930 and/or the user computing device 902 via the network 980.

The user computing device 902 can include one or more processors 912, one or more memory components 914, a graphical display 920, and/or one or more user input components 922. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more graphical displays 920. For example, the graphical display 920 can be configured to display information, which can include user interfaces such as the dynamic carousel interface. The one or more user input components 922 can be configured to receive one or more inputs from a user. For example, the one or more user input components 922 can include one or more buttons, one or more keys, and/or one or more sensors.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations. The server computing system 930 can store and/or provide a dynamic carousel interface 940 that is configured to include a plurality of content items provided via a dynamic carousel interface. Additionally and/or alternatively, the server computing system 930 can store and/or provide a developer interface 942. The developer interface 942 can be configured to receive inputs from a developer to generate a developer-generated dynamic carousel interface.

The developer computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the developer computing system 950 to perform operations. The developer computing system 950 can include one or more stored content items 960 and/or one or more stored preferences 962. The one or more stored content items 960 can include image data, text data, and/or video data that can be provided to the server computing system 930 via the developer interface 942 to generate the dynamic carousel interface. The one or more stored preferences 962 can be descriptive of one or more preferences selected by the developer and/or determined based on past interactions. The one or more stored preferences 962 can be provided to the server computing system to be utilized to configure the dynamic carousel interface.

In some implementations, the server computing system 930 and the developer computing system 950 can exchange data to generate the dynamic carousel interface, and the server computing system 930 and the user computing device 902 can communicate to provide the dynamic carousel interface to the user.

Example System Arrangements

Figure 2:
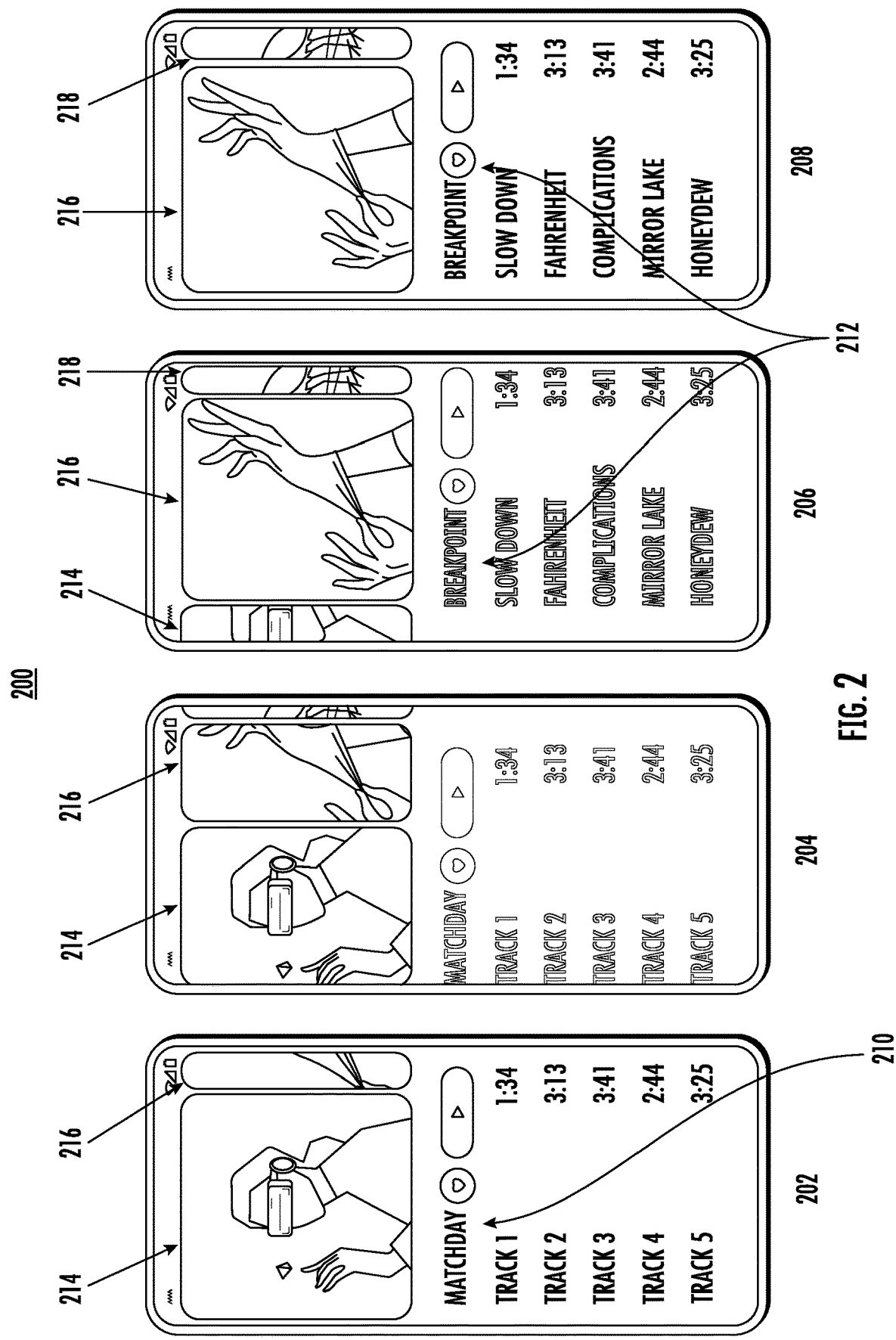
FIG. 2 depicts an illustration of an example content item display transition according to example embodiments of the present disclosure.

FIG. 2 depicts an illustration of an example content item display transition 200 according to example embodiments of the present disclosure. In particular, FIG. 2 can depict a content item display transition 200 in a music player interface. At 202, a first content item 214 can be provided for display in an expanded container, and the second content item 216 can be provided for display in a collapsed container. The first content item 214 can be associated with a first playlist 210 such that information associated with the first playlist can be provided for display when the container of the first content item 214 is expanded. A navigation input may then be obtained, which can trigger the scrolling of the carousel. At 204, the transition can begin. At 204, the container for the first content item 214 can begin to collapse, and the container of the second content item 216 can begin to expand. The information associated with the first playlist 210 can begin to fade. At 206, the container of the first content item 214 can continue to collapse and fade off screen to the left, and the container of the second content item 216 can continue to expand. Additionally and/or alternatively, at 206, a container (e.g., a collapsed container) with a third content item 218 can appear, and information associated with a second playlist 212 can begin to appear. At 208, the container with the first content item 214 may be off-screen, and the container of the second content item 216 can be fully expanded. At 208, the container with the third content item 218 can be displayed, and the information with the second playlist 212 can be displayed.

Figure 3B:
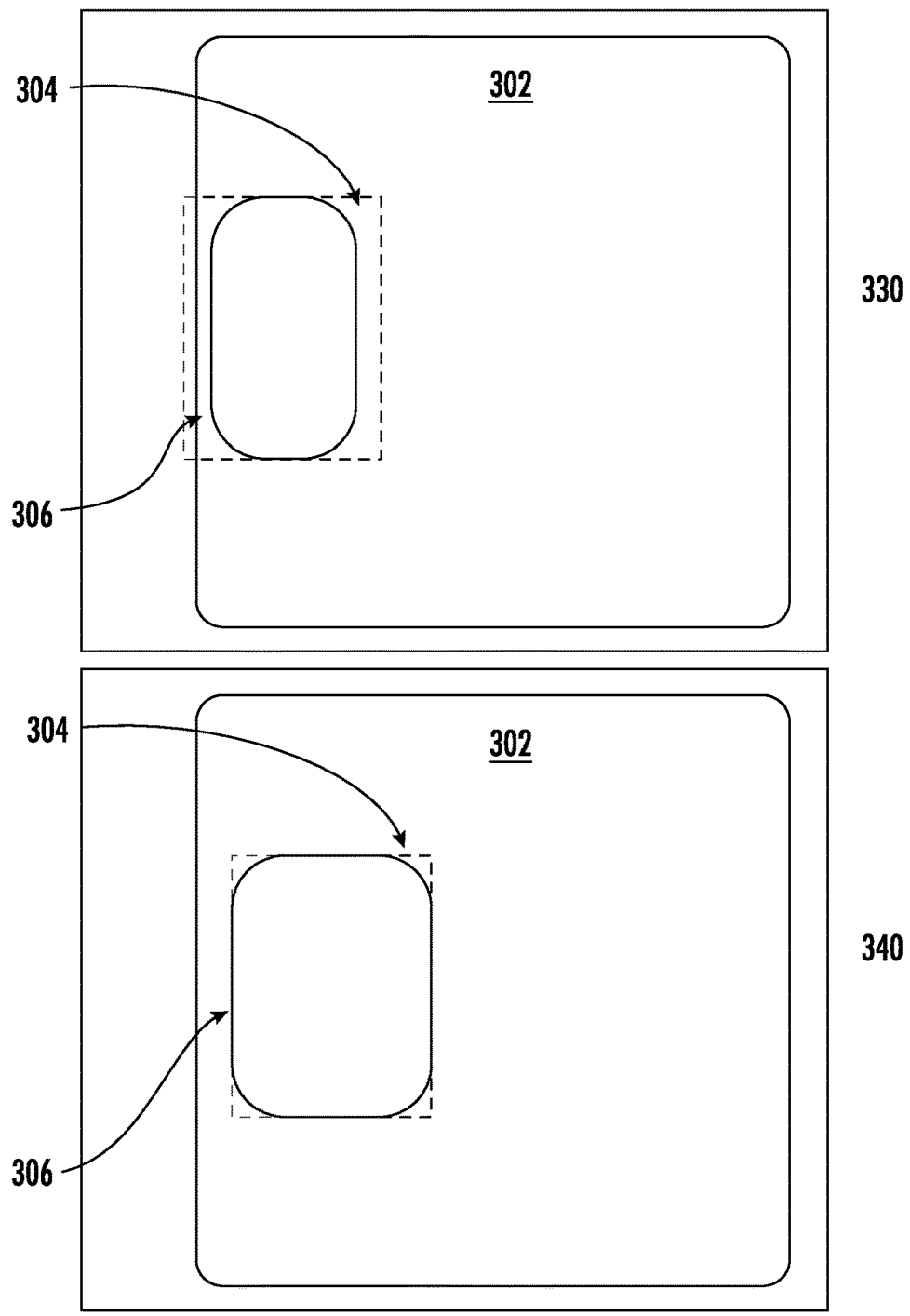

FIGS. 3A-3B depict a block diagram of an example container size adjustment 300 according to example embodiments of the present disclosure. The container size adjustment 300 can be paired with a masking adjustment that adjusts the masking level of the content item 304. For example, a plurality of content items can be included in a dynamical carousel interface 302. In particular a content item 304 can be provided for display in a container 306. The container 306 of the content item 304 can expand and collapse as the carousel scrolls. As the container 306 fluctuates in size, the masking of the content item 304 can fluctuate to adjust for the container size change.

FIG. 3A can include a collapsed state 310 and a first intermediate state 320. The collapsed state 310 can be a smallest state for the container 306, which can be the largest masking level for the content item 304. The collapsed state 310 can include the container 306 being a pill shape. In some implementations, the container 306 and the content item 304 can be dissected by the edge of the display.

The first intermediate state 320 can include the container 306 being slightly larger than when at the collapsed state 310. The masking level of the content item 304 can decrease when compared to the collapsed state 310. The container 306 and the content item 304 can be shifted to the right when compared to the collapsed state 310.

FIG. 3B can include a second intermediate state 330 and an expanded state 340.

The second intermediate state 330 can include the container 306 being slightly larger than when at the first intermediate state 320. The masking level of the content item 304 can decrease when compared to the first intermediate state 320. The container 306 and the content item 304 can be shifted to the right when compared to the first intermediate state 320.

The expanded state 340 can include the container 306 being larger than when at the second intermediate state 330. The masking level of the content item 304 can decrease when compared to the second intermediate state 330. The container 306 and the content item 304 can be shifted to the right when compared to the second intermediate state 330. The expanded state 340 can include the lowest level of masking and the largest container size. In some implementations, the expanded state 340 can include no masking or limited masking for adjusting the shape of the content item (e.g., masking sharp corners).

Figure 4A:
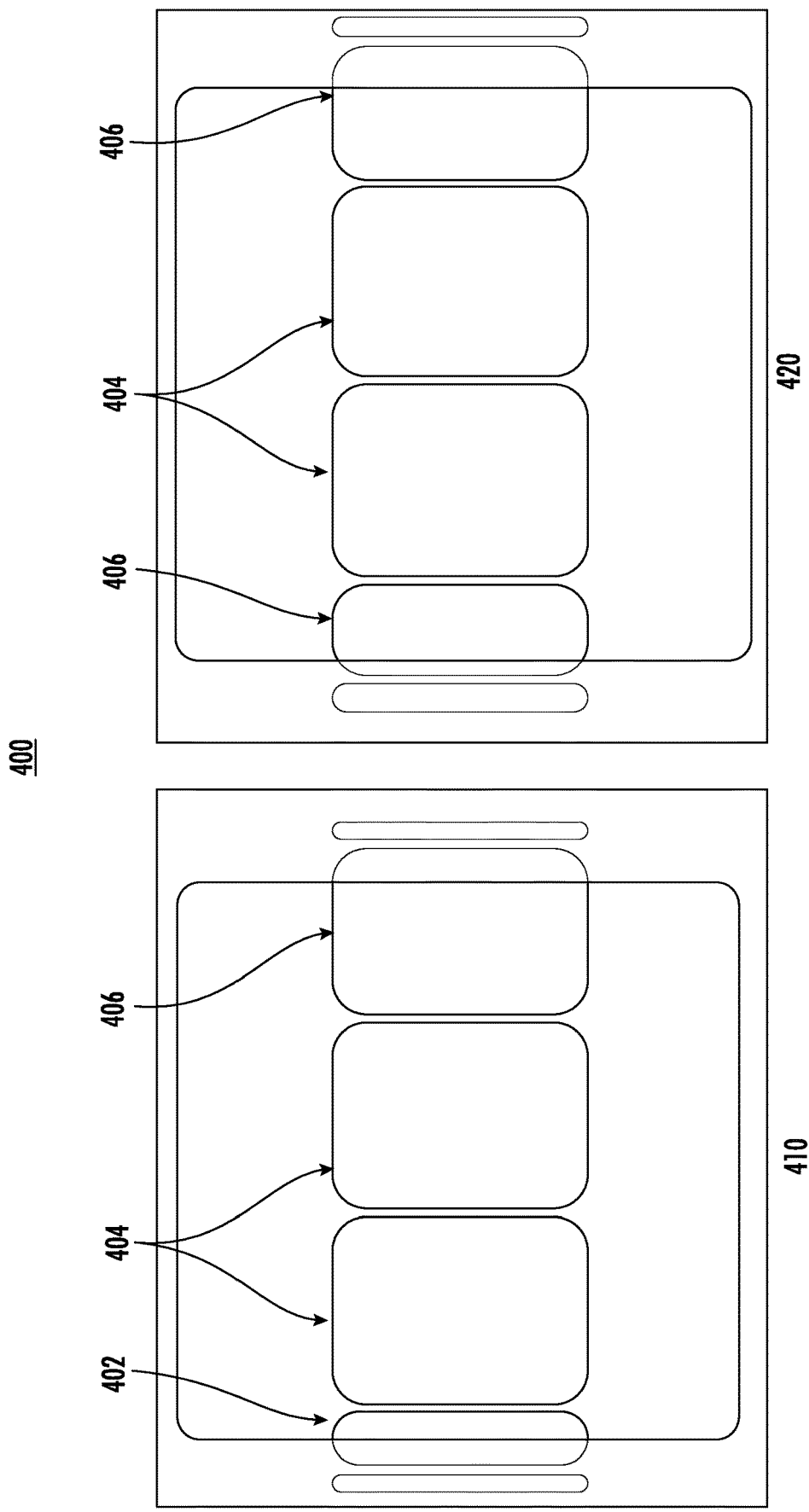
FIGS. 4A-4B depict illustrations of an example carousel interface according to example embodiments of the present disclosure.
Figure 4B:
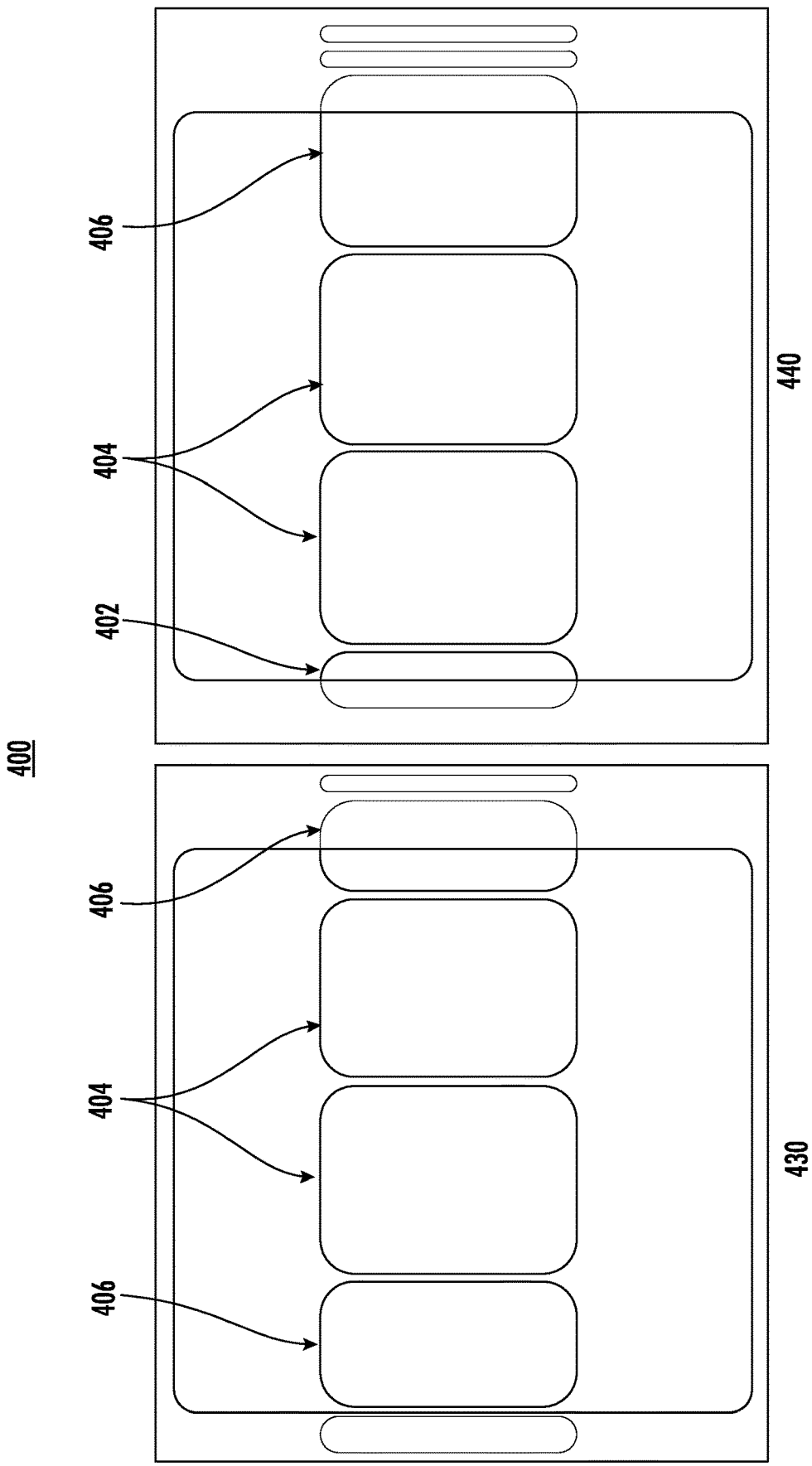

FIGS. 4A-4B depict illustrations of an example carousel interface 400 according to example embodiments of the present disclosure. In particular, FIGS. 4A-4B can depict an example carousel interface 400, which can display one or more collapsed containers 402, one or more expanded containers 404, and/or one or more transition containers 406. The collapsed containers 402 can display a portion of a content item, the transition containers 406 can display a larger portion of the content item, and the expanded container 404 can display an even larger portion of the content item. The collapsed containers 402 can transform into transition containers 406, which can transform into expanded containers 404. Additionally and/or alternatively, the expanded containers 404 can transform into transition containers 406, which can transform into collapsed containers 402. The transformations (or transitions) can occur as the carousel rotates (or scrolls).

At 410, a collapsed container 402, two expanded containers 404, and a transition container 406 can be displayed. At 420, the carousel can rotate, and the containers can adjust in size. At 420, two expanded containers 404 can be provided for display in between two transition containers 406. At 430, the carousel can rotate further, and the containers can further adjust in size. At 430, two expanded containers 404 can be provided for display in between two transition containers 406. At 440, the carousel can rotate once again to return to the same state as at 410; however, the specific containers and their respective content items at each position may be different from at 410.

FIGS. 5A-5C depict illustrations of an example display container transition according to example embodiments of the present disclosure. In particular, FIG. 5A can depict a collapsed state 510 of a container 502. For example, the collapsed state 510 can include the container 502 being a smallest size (e.g., 24 dp wide), which can be measured based on virtual pixel units and may be configured by a developer and/or a user. FIG. 5B can depict a transition state 520 of the container 502. The transition state 520 can include the container 502 being larger than when the container 502 was in the collapsed state 510. FIG. 5C can depict an expanded state 530 of a container 502. For example, the expanded state 510 can include the container 502 being a largest size (e.g., 278 dp wide), which can be measured based on virtual pixel units and may be configured by a developer and/or a user.

Figure 10:
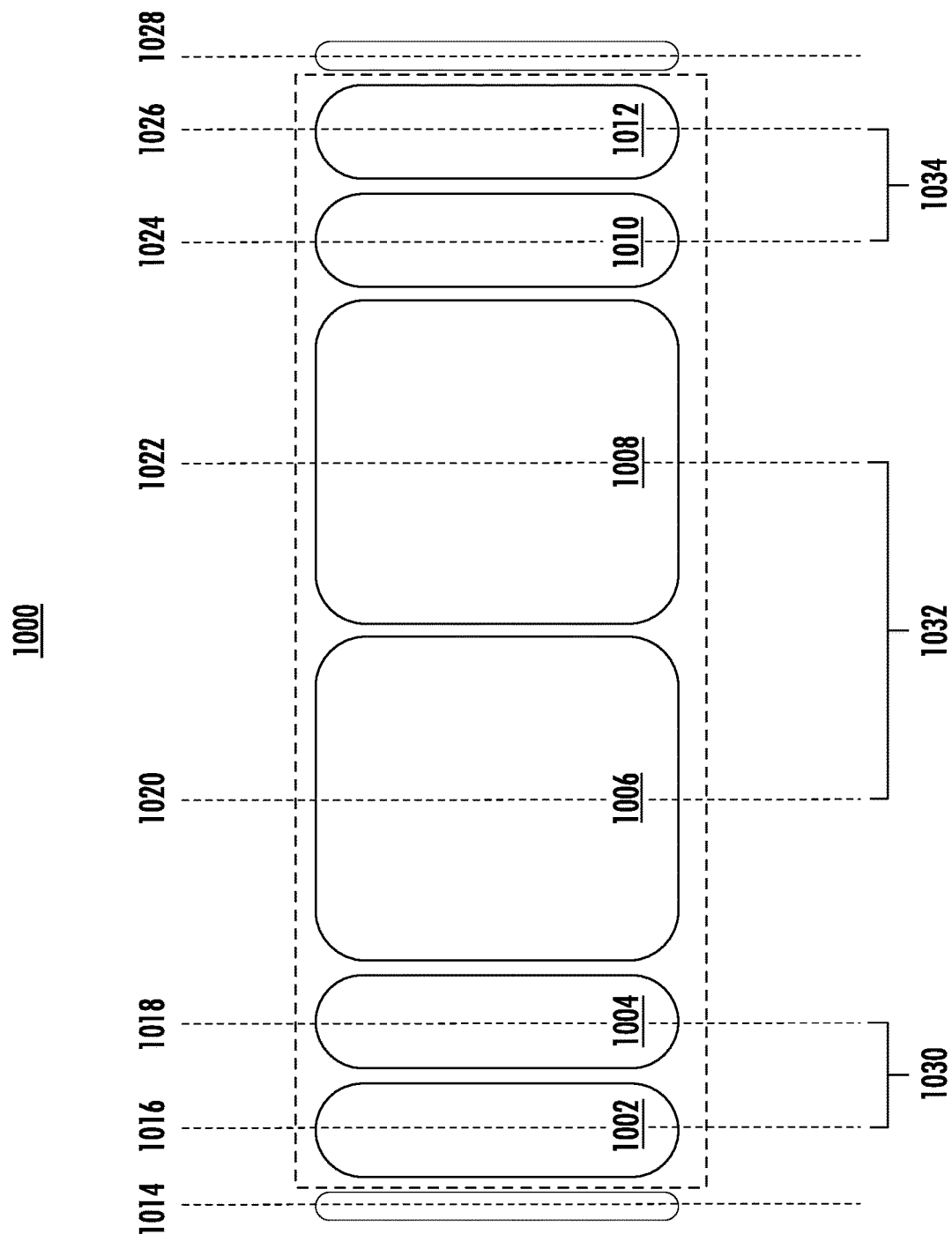
FIG. 10 depicts a block diagram of an example key line layout according to example embodiments of the present disclosure.

FIG. 10 depicts a block diagram of an example key line layout 1000 according to example embodiments of the present disclosure. In particular, FIG. 10 can depict a plurality of key lines associated with a plurality of different container sizes. For example, the dynamic carousel interface depicted in FIG. 10 can include a first content item displayed in a first container 1002, a second content item displayed in a second container 1004, a third content item displayed in a third container 1006, a fourth content item displayed in a fourth container 1008, a fifth content item displayed in a fifth container 1010, and a sixth content item in a sixth container 1012. The size of each container can be based on the position of the container in the user interface. The positions can be associated with one or more key lines. In particular, edge key lines 1014 and 1028 can be utilized to determine that the content item will not be shown. A first key line 1016, a second key line 1018, a fifth key line 1024, and a sixth key line 1026 can be associated with a collapsed size for the container, which can be a pill shape. Therefore, each of the containers (e.g., 1002, 1004, 1010, and 1012) at the collapsed state key lines (e.g., 1016, 1018, 1024, and 1026) may be a pill shape. Additionally and/or alternatively, a third key line 1020 and a fourth key line 1022 can be associated with an expanded size for the container, which can be a larger display container. Therefore, the third container 1006 and the fourth container 1008 can be in an expanded state.

In some implementations, the transition between certain key lines may cause little to no change in container size (e.g., 1030, 1032, and 1034). Additionally and/or alternatively, the containers may have a constant, progressive change in container size between key lines (e.g., between 1018 and 1020).

Figure 11:
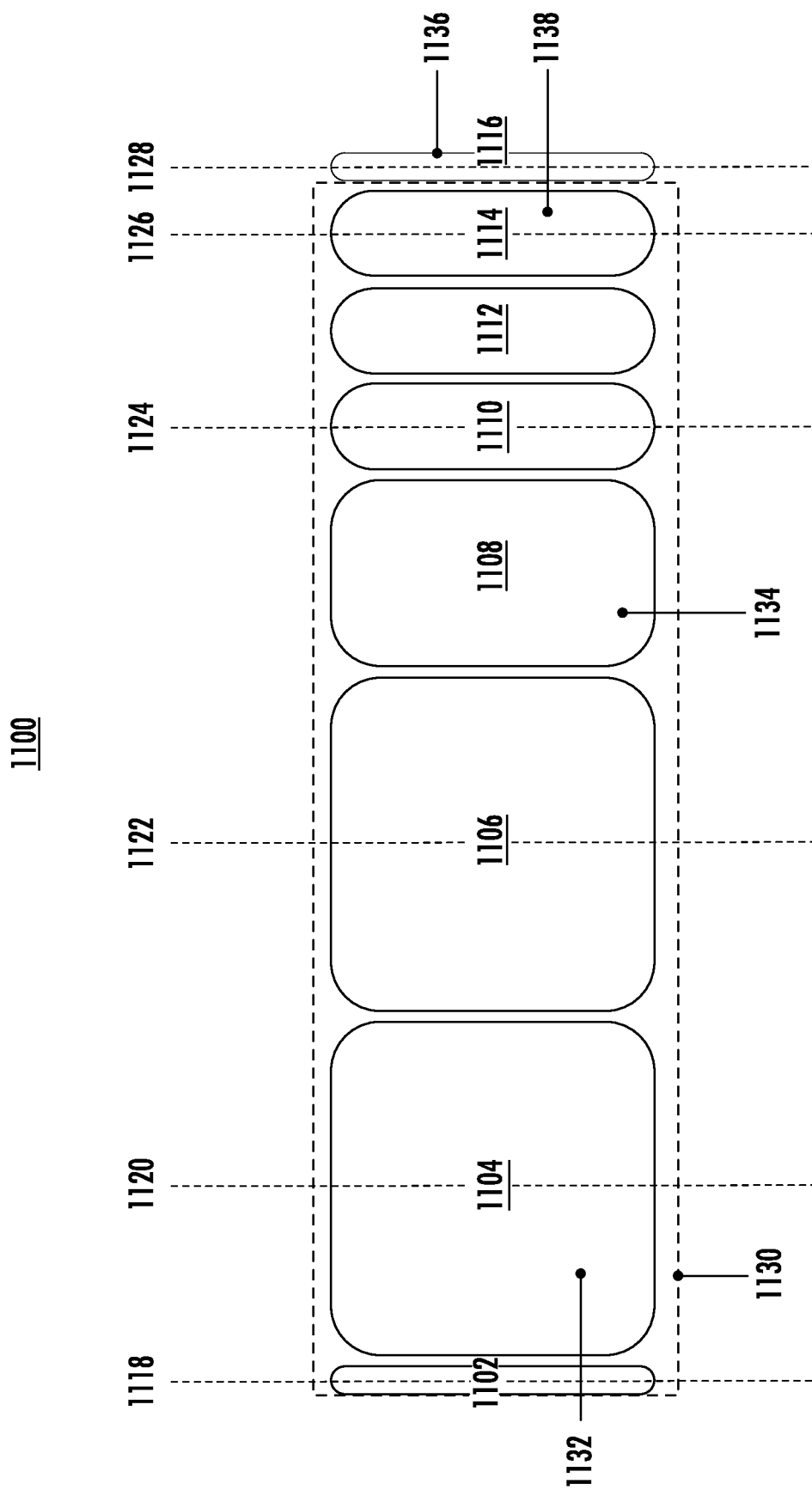
FIG. 11 depicts a block diagram of an example key line layout according to example embodiments of the present disclosure.

FIG. 11 depicts a block diagram of an example key line layout 1100 according to example embodiments of the present disclosure. In particular, FIG. 11 can depict a dynamic carousel interface 1130 that includes a plurality of containers (e.g., 1102, 1104, 1106, 1108, 1110, 1112, 1114, and 1116). The size of each of the containers can be based on one or more key lines associated with a position of the container. The different container sizes can include an expanded size 1132 (e.g., the largest size), a range of transitions sizes 1134 (e.g., a range of sizes between a largest size and a smallest size (e.g., a collapsed size or null)), a collapsed size 1138 (e.g., a smallest display size (e.g., a pill shape)), and/or a null size (e.g., when the content item of the container is no longer provided for display).

For example, a second key line 1120 and a third key line 1122 can be associated with the expanded size 1132. Therefore, the containers (e.g., 1104 and 1106) at or between the second key line 1120 and the third key line 1122 may be the expanded size 1132. The fourth key line 1124 and the fifth key line 1126 can be associated with a collapsed size 1138. Therefore, the containers (e.g., 1108) between the third key line 1122 and the fourth key line 1124 can be of a transition size 1134. The containers (e.g., 1110, 1112, and 1114) at or between the fourth key line 1124 and the fifth key line 1126 can be a collapsed size 1138. Additionally and/or alternatively, when a container (e.g., 1118 and 1128) moves directly to a null key line (e.g., 1118 and 1128), the container (e.g., 1118 and 1128) may disappear from the display.

Figure 12A:
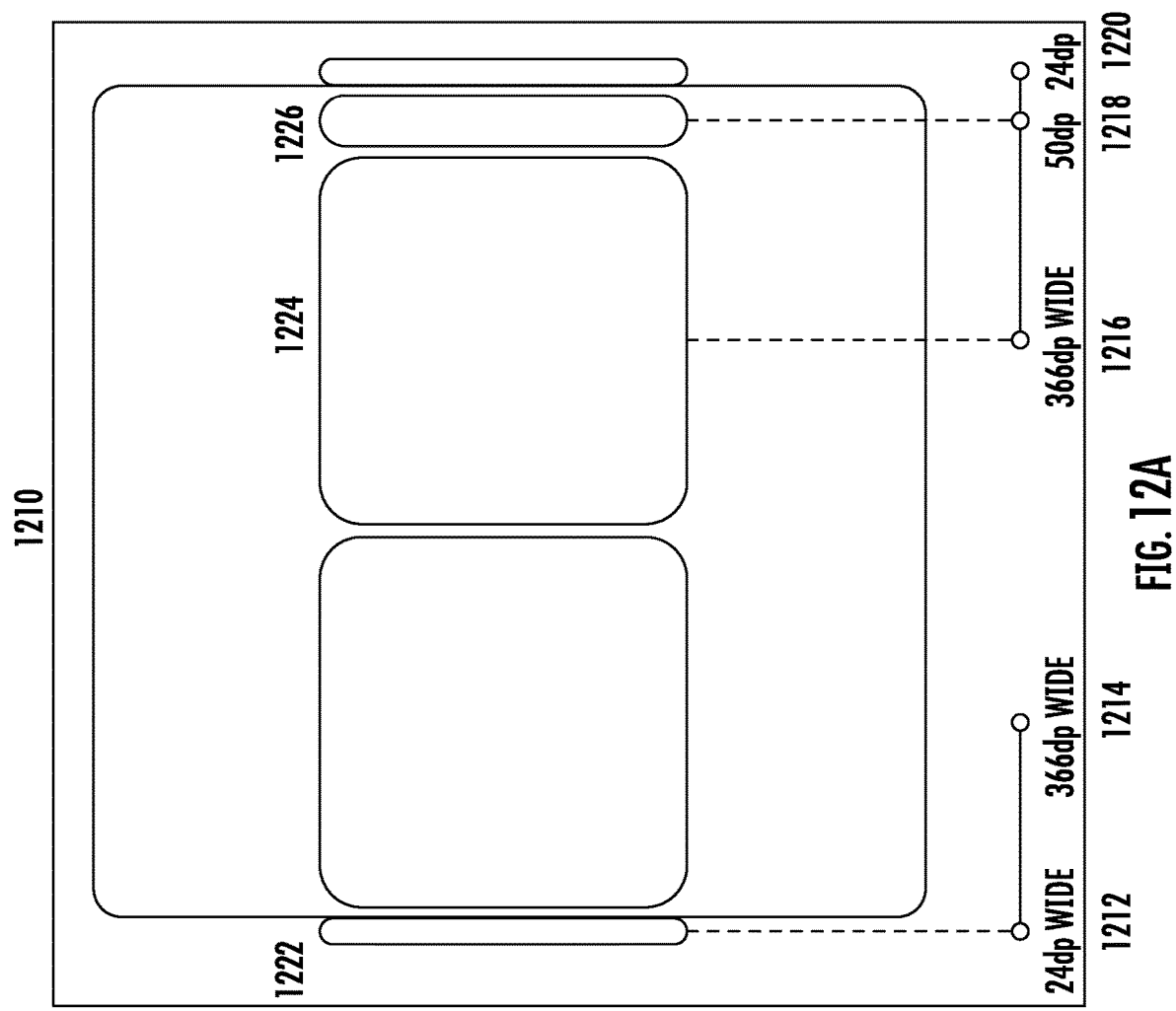
Figure 12B:
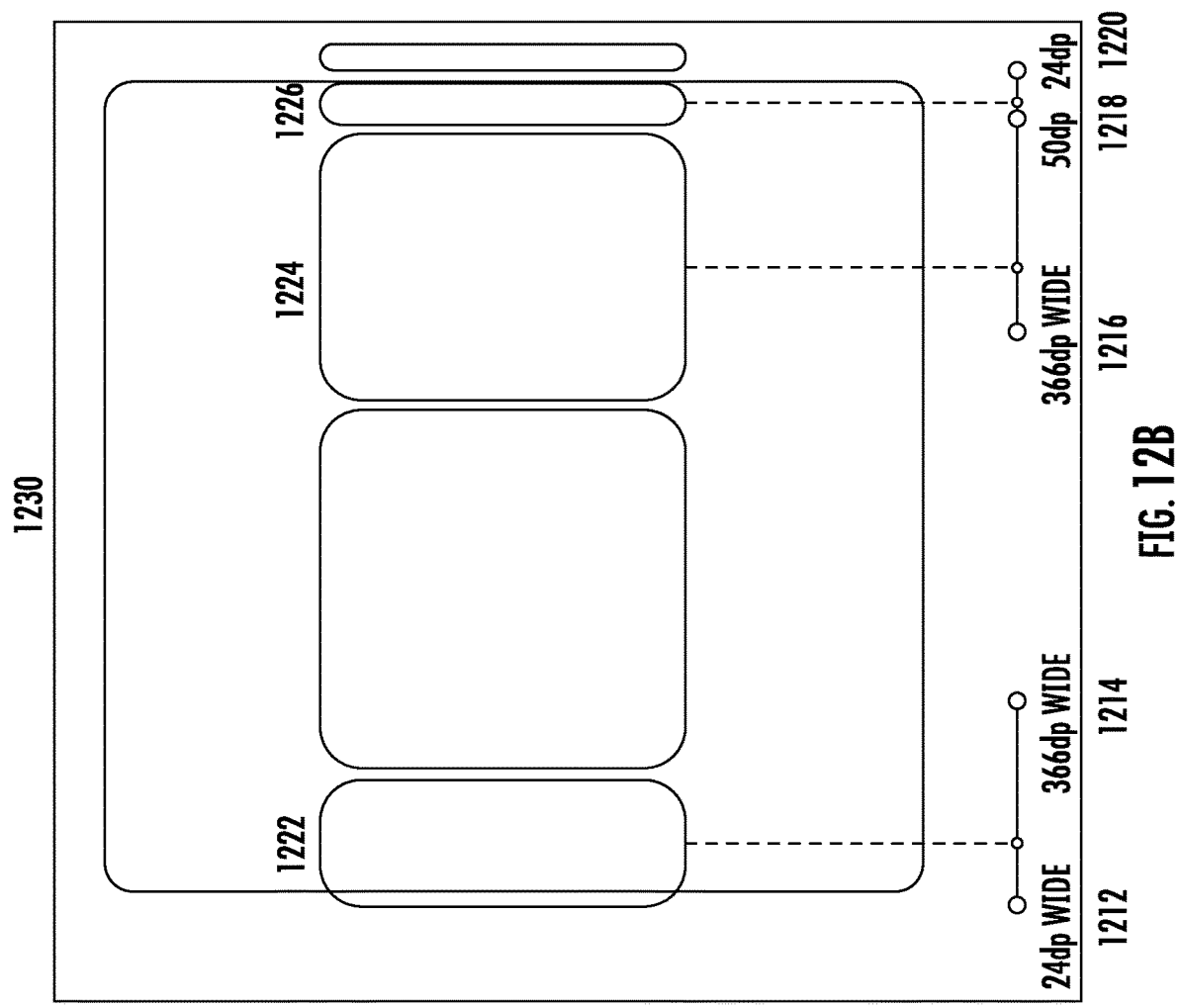

FIGS. 12A-12C depict a block diagram of an example container size transition according to example embodiments of the present disclosure. FIGS. 12A-12C can depict the transition from a null size to an expanded size to a collapsed size to a null size. The transition can occur from left to right, right to left, up to down, and/or down to up. For example, the first transition can be from a first position 1212 (e.g., off the screen on the left) to a second position 1214. The second transition can be from a third position 1216 (e.g., a second expanded state position) to a fourth position 1218 (e.g., a collapsed size position). The third transition can be from the fourth position 1218 to the fifth position 1220 (e.g., a null size position).

For example, at a first time 1210, a first container 1222 may be off-screen, a second container 1224 may be an expanded size, and a third container 1226 may be a collapsed size. At a second time 1230, the first container 1222 may be in transition to the expanded size from no size, the second container 1224 may be in transition from the expanded size to the collapsed size, and the third container 1226 may be in transition from the collapsed size to nothing. At a third time 1250, the first container 1222 may be the expanded size, the second container 1224 may be the collapsed size, and the third container 1226 may be off-screen.

In some implementations, the transition sizes from expanded state to collapsed state and the sizes below collapsed size may be provided for display as transformation effects, and the expanded size and the collapsed size may be static sizes for containers.

Figure 13A:
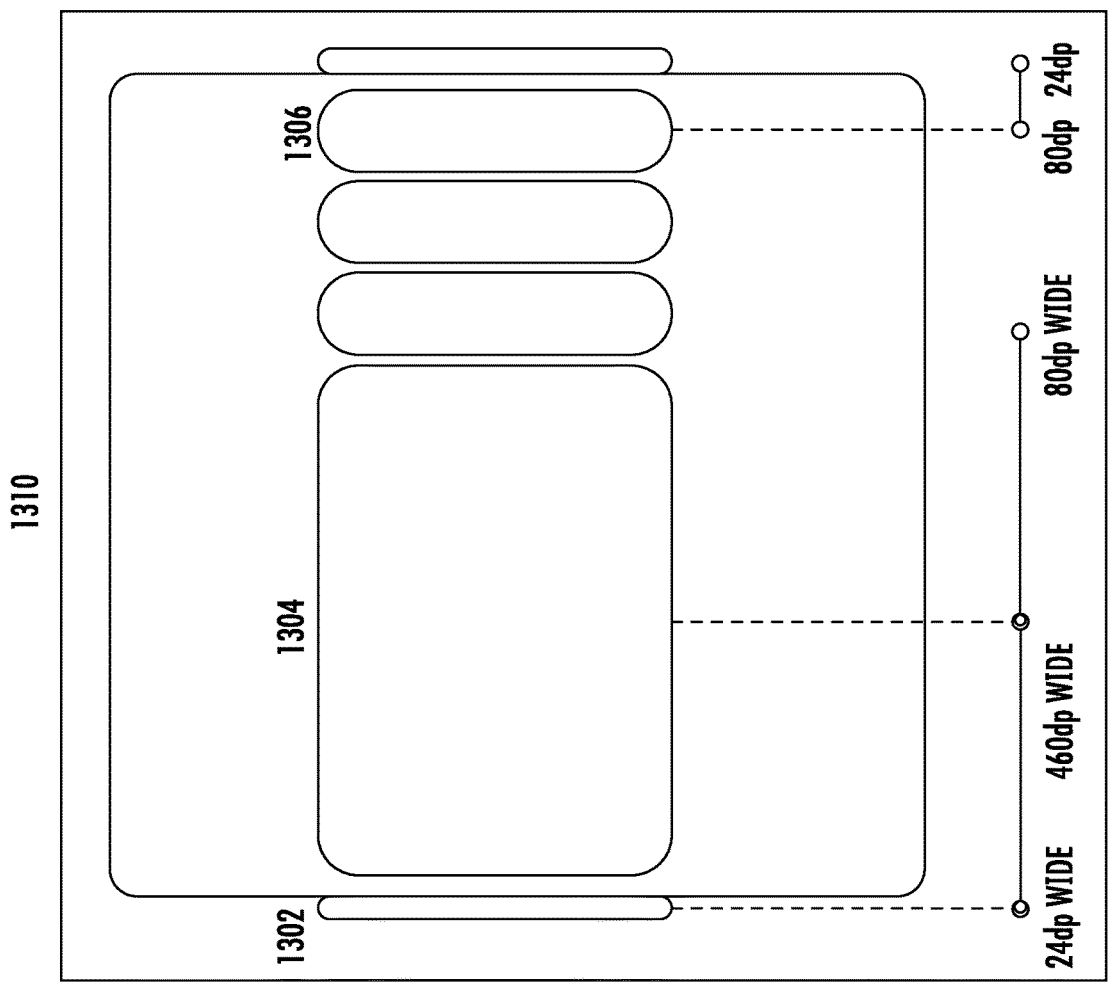
FIGS. 13A-13C depict a block diagram of an example container size transition according to example embodiments of the present disclosure.
Figure 13B:
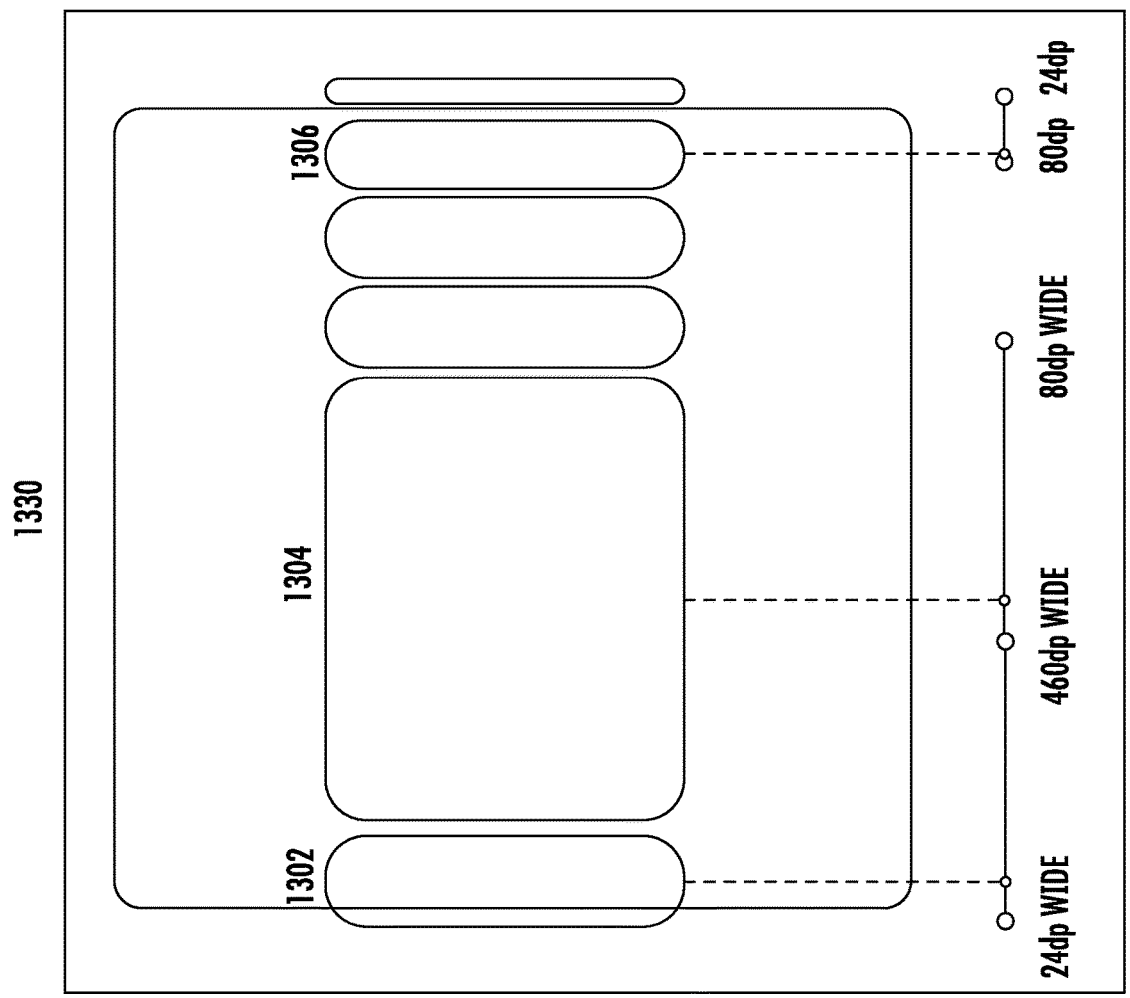
Figure 13C:
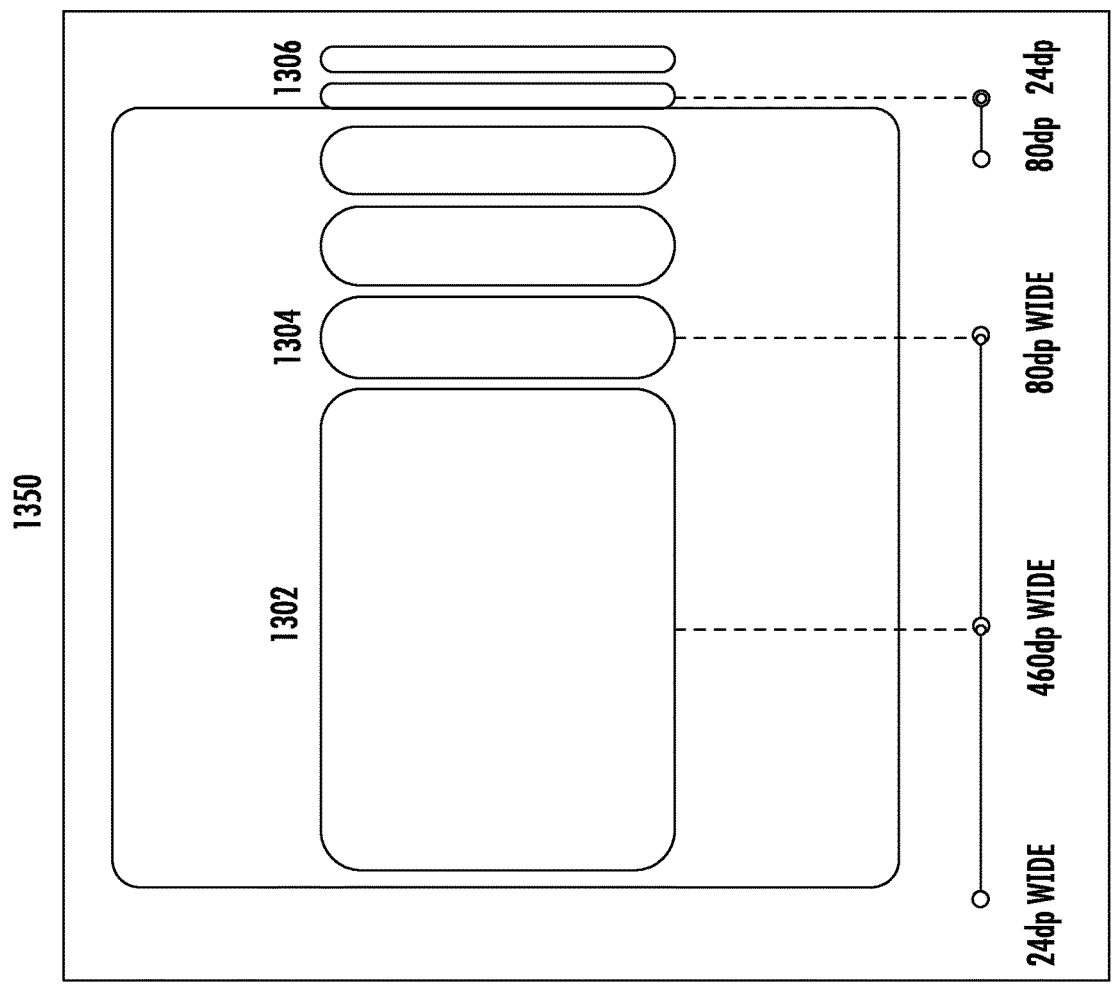

FIGS. 13A-13C depict a block diagram of an example container size transition according to example embodiments of the present disclosure. FIGS. 13A-13C can depict the transition from a null size to an expanded size to a collapsed size to a null size. The transition can occur from left to right, right to left, up to down, and/or down to up. For example, the first transition can be from a first position (e.g., off the screen on the left) to a second position. The second transition can be from a third position (e.g., a second expanded state position) to a fourth position (e.g., a collapsed size position). The third transition can be from the fourth position to the fifth position (e.g., a null size position).

For example, at a first time 1310, a first container 1302 may be off-screen, a second container 1304 may be an expanded size, and a third container 1306 may be a collapsed size. At a second time 1330, the first container 1302 may be in transition to the expanded size from null size, the second container 1304 may be in transition from the expanded size to the collapsed size, and the third container 1306 may be in transition from the collapsed size to null size. At a third time 1350, the first container 1302 may be the expanded size, the second container 1304 may be the collapsed size, and the third container 1306 may be off-screen.

In some implementations, the transition sizes from expanded state to collapsed state and the sizes below collapsed size may be provided for display as transformation effects, and the expanded size and the collapsed size may be static sizes for containers.

The layout of FIGS. 12A-12C may differ from the layout of FIGS. 13A-13C. For example, the layout of FIGS. 12A-12C can include multiple expanded containers, while the layout of FIGS. 13A-13C can include a single expanded container.

Figure 14A:
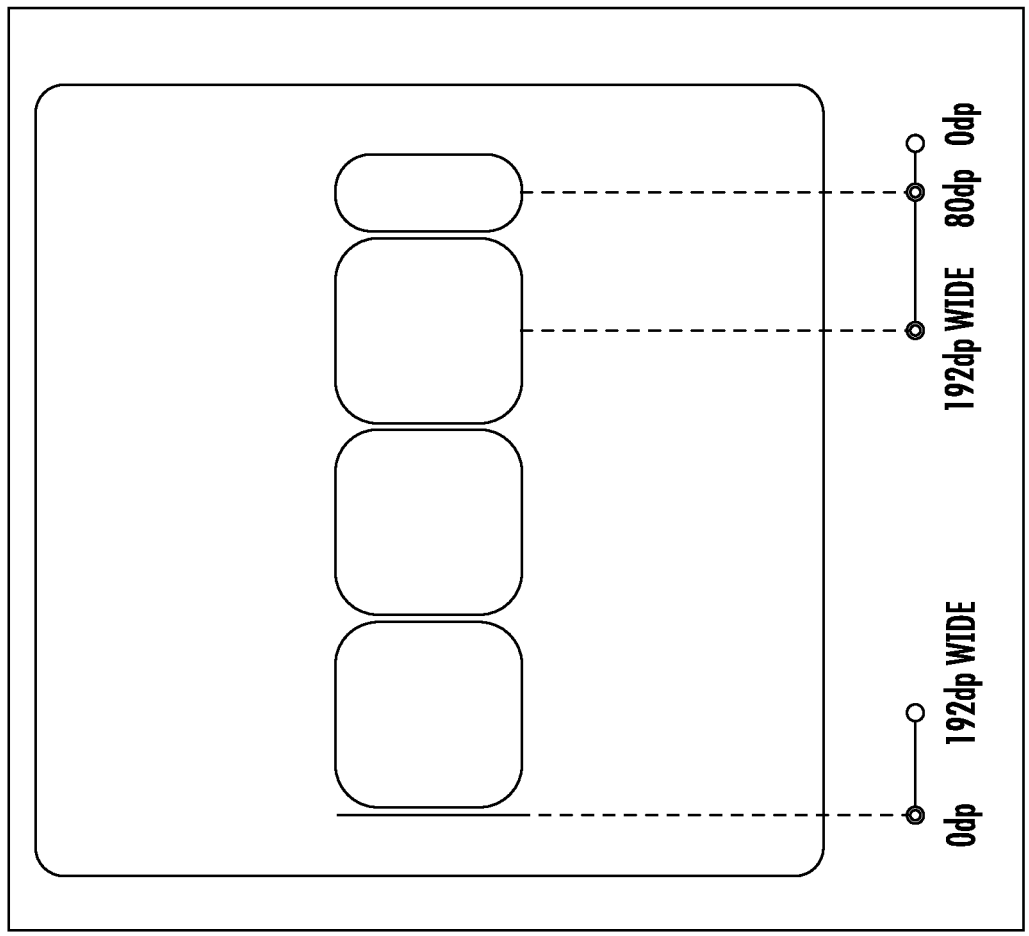
Figure 14B:
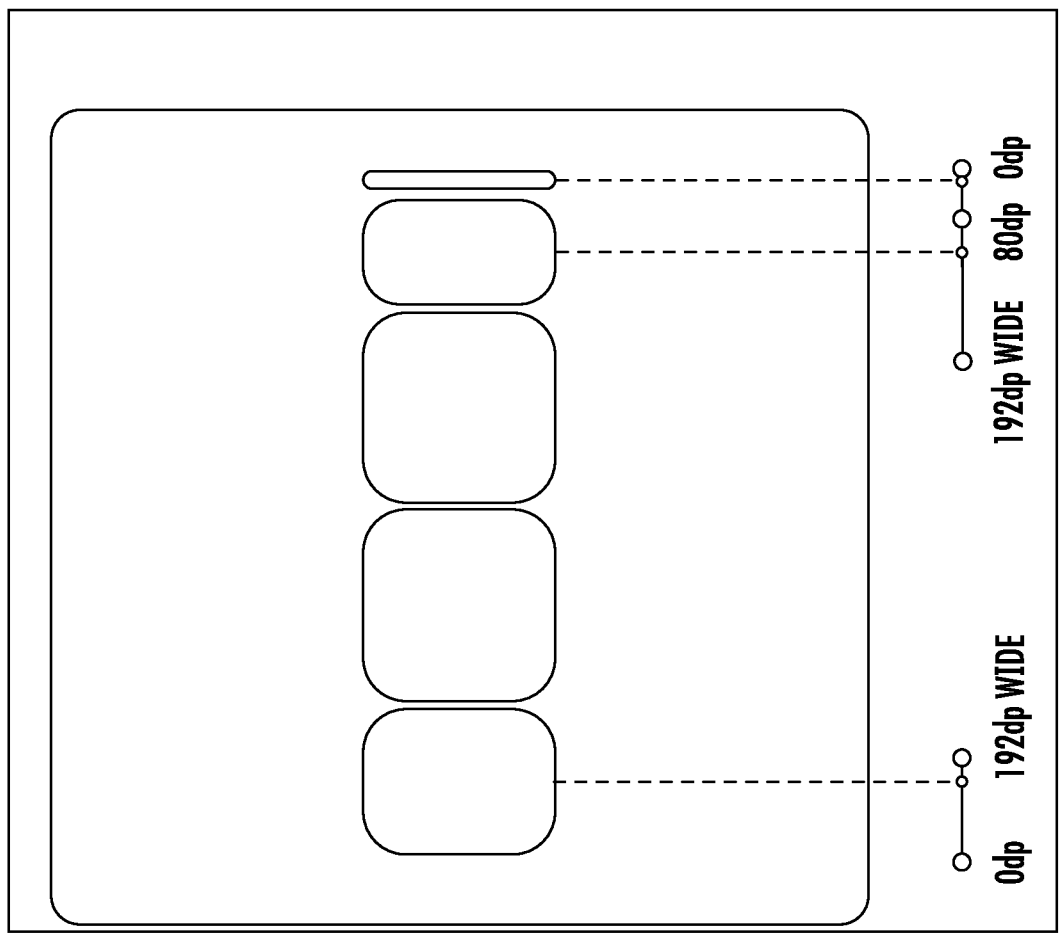

FIGS. 14A-14C depict a block diagram of an example container size transition according to example embodiments of the present disclosure. The container size transition of FIGS. 14A-14C can include similar transitions to the transitions in FIGS. 12A-12C and FIGS. 13A-13C. The layout of FIGS. 14A-14C may differ from the layouts in FIGS. 12A-12C and FIGS. 13A-13C. In particular, at a first time 1410, a first configuration can be provided for display. A navigation input can be obtained, which can cause a transition to occur (e.g., the state at a second time 1430). At a second time 1450, a second configuration can be provided for display. The first configuration and the second configuration can be static configurations, while the configuration displayed during transition (e.g., at the second time 1430) may be a dynamic configuration and not a static configuration.

FIG. 15 depicts a block diagram of example display layouts 1500 according to example embodiments of the present disclosure. In some implementations, the example display layouts 1500 can include an expanded container to the left of one or more collapsed containers (e.g., at 1502). Additionally and/or alternatively, the example display layouts 1500 can include an expanded container between collapsed containers (e.g., at 1504). The example display layouts 1500 can include an expanded container between containers bleeding off the edge of the display (e.g., at 1506). The example display layouts 1500 can differ from a layout with containers of a uniform size.

Figure 16A:
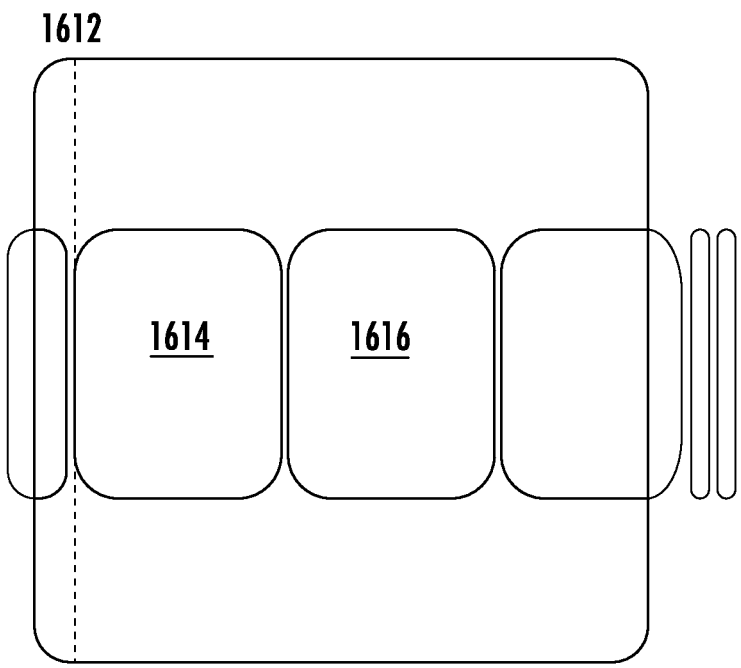
FIGS. 16A-16B depict a block diagram of example display layouts according to example embodiments of the present disclosure.
Figure 16B:
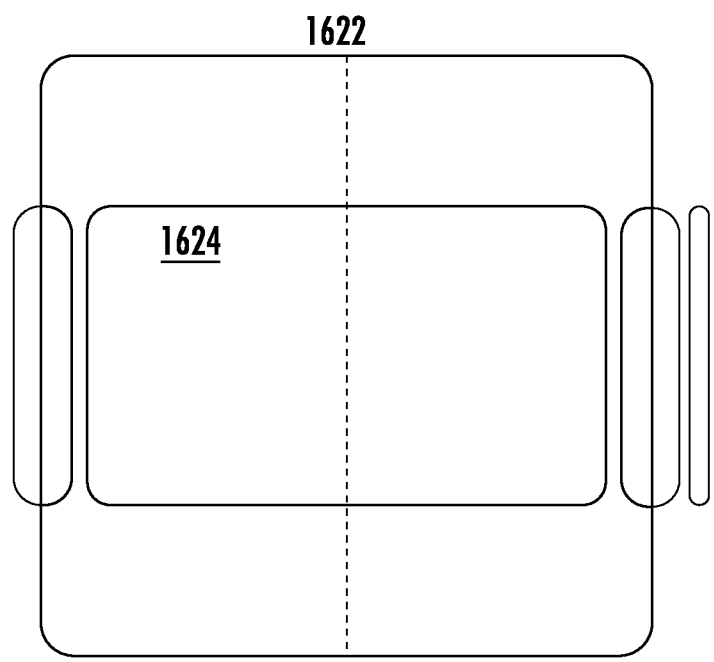

FIGS. 16A-16B depict a block diagram of example display layouts according to example embodiments of the present disclosure. For example, the example display layouts can include a layout with multiple expanded containers (e.g., 1614 and 1616) aligned to the left (e.g., at 1612). Alternatively and/or additionally, the example display layouts can include a layout with a singular expanded container (e.g., 1624) aligned to the center (e.g., at 1622). In some implementations, the alignment may be to the right and/or to another predetermined position.

Figure 17:
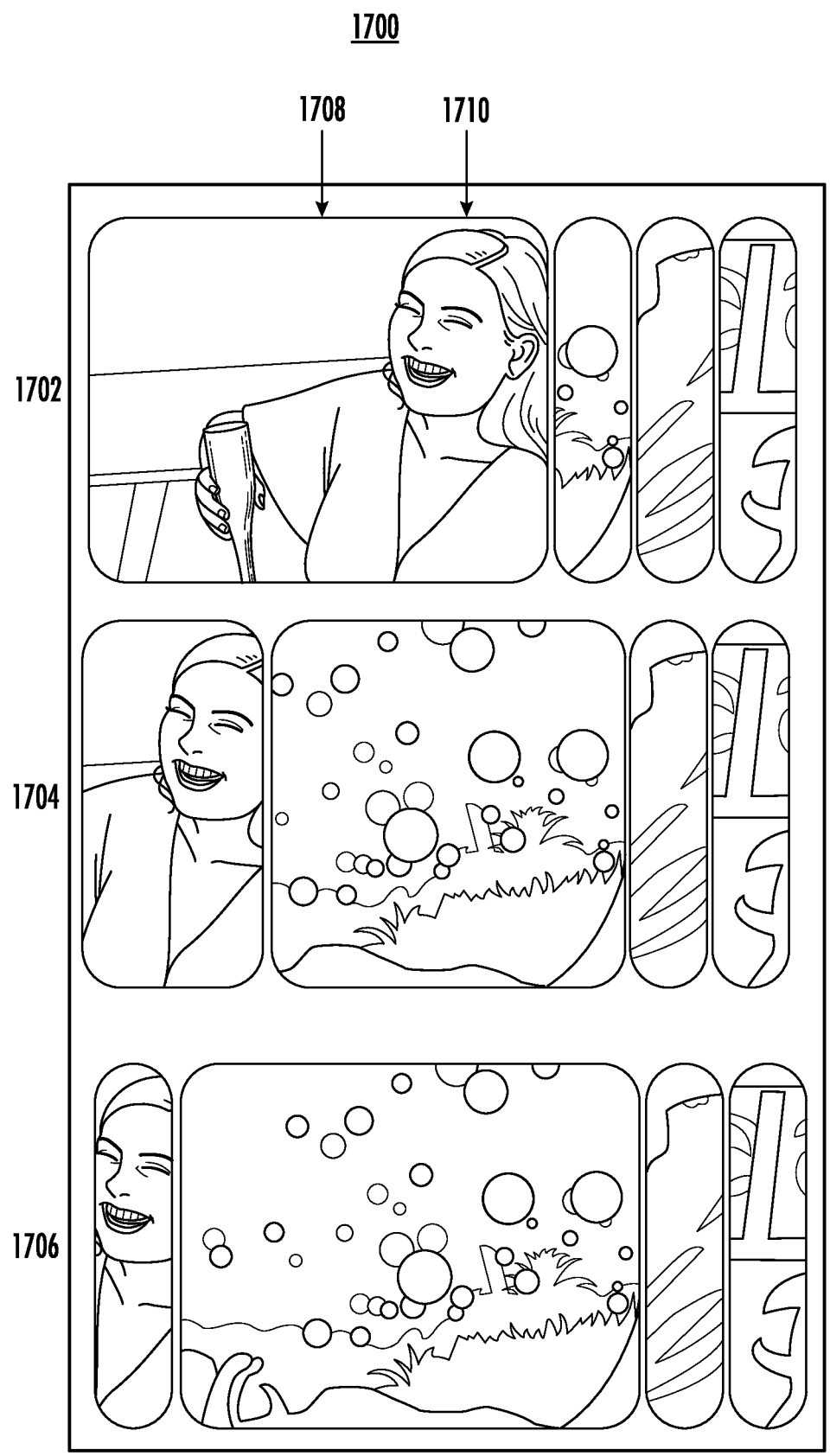
FIG. 17 depicts an illustration of an example smart cropping transition according to example embodiments of the present disclosure.

FIG. 17 depicts an illustration of an example smart cropping transition 1700 according to example embodiments of the present disclosure. For example, in some implementations, the masking of the content item to fit a container can be based on a determined focal point and/or based on a determined foreground object. In FIG. 17, the person 1710 can be determined to be the foreground object (e.g., the focal point). Therefore, as the container of the content item moves from a first state 1702 to a second state 1704 to an eventual third state 1706, the person 1710 can be provided for display in the container as the container decreases in size. In some implementations, the center 1708 of the content item may be masked in order to continue to provide the focal point for display.

Figure 18:
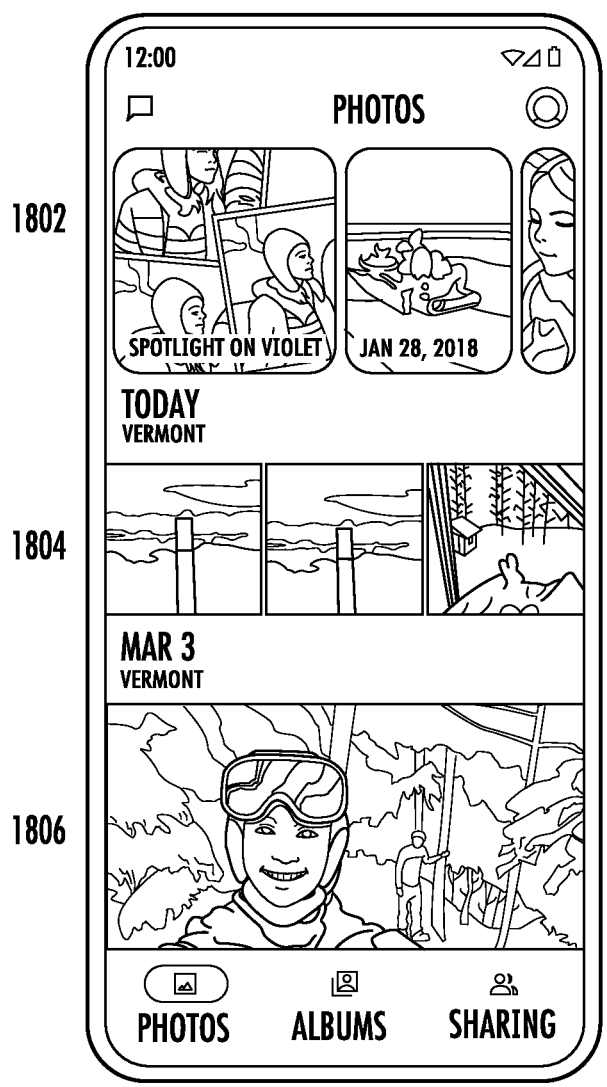
FIG. 18 depicts an illustration of an example image gallery interface according to example embodiments of the present disclosure.

FIG. 18 depicts an illustration of an example image gallery interface 1800 according to example embodiments of the present disclosure. The example image gallery interface 1800 can include a dynamic carousel interface 1802, which can include a dynamic carousel interface. Additionally and/or alternatively, the image gallery interface 1800 can include a standard carousel 1804 and large display portion 1806. Each of the dynamic carousel interface 1802, the standard carousel 1804, and the large display portion 1806 can provide the images in the image gallery for display.

Figure 19:
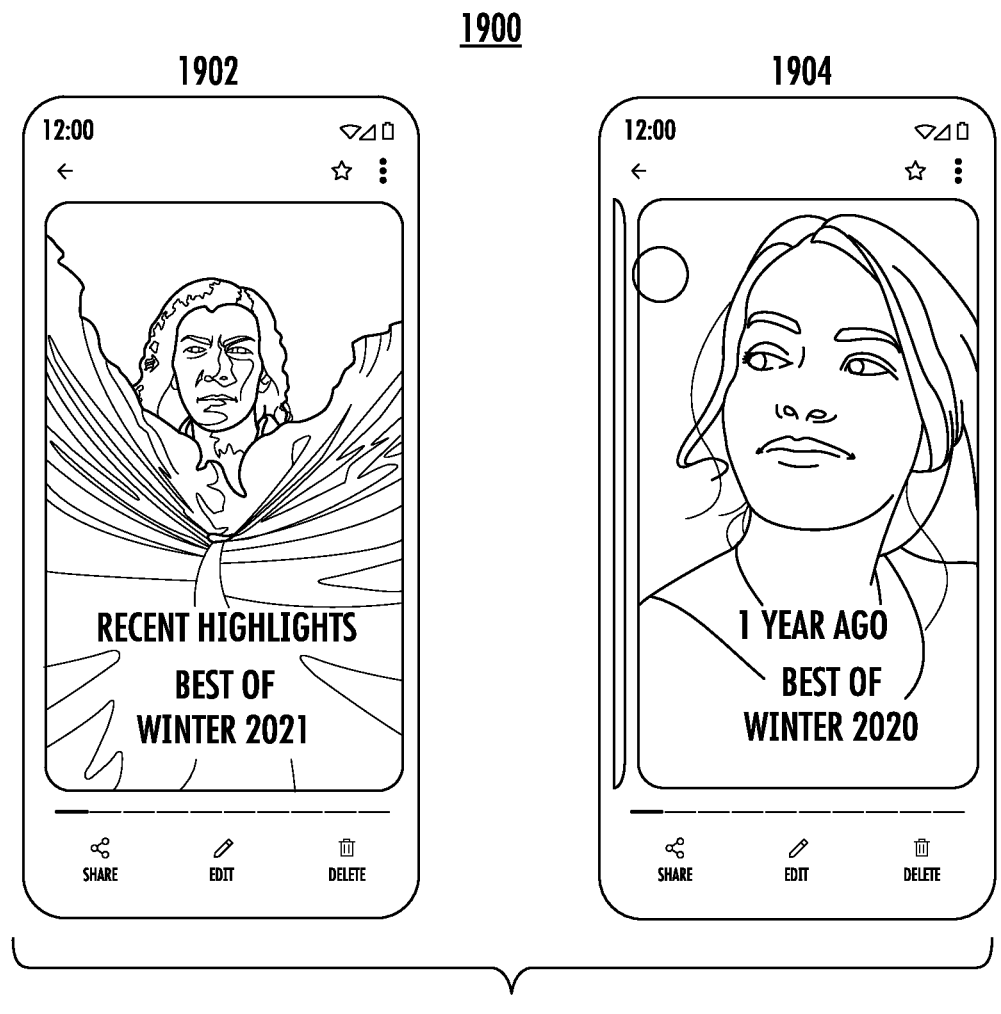
FIG. 19 depicts an illustration of an example image gallery interface according to example embodiments of the present disclosure.

FIG. 19 depicts a block diagram of an example image gallery interface 1900 according to example embodiments of the present disclosure. In some implementations, a selection to a container of the dynamic carousel interface 1802 can cause a second dynamic carousel interface to be provided for display. For example, the first story slide 1902 can be provided for display in response to a selection of a container of the dynamic carousel interface 1802. An additional input can then be received, which can cause the second story slide 1904 to be provided for display.

Figure 20:
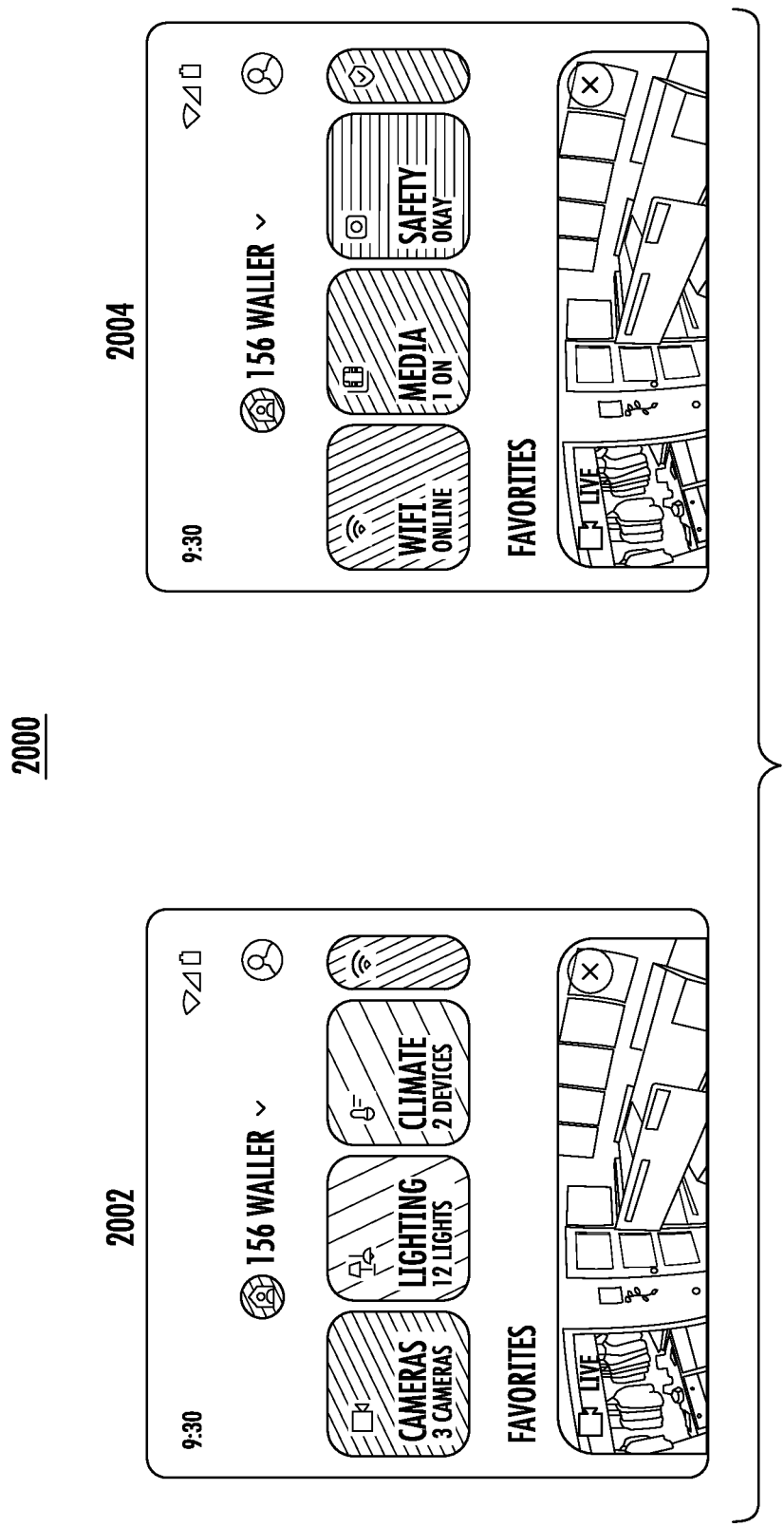
FIG. 20 depicts an illustration of an example smart device control interface according to example embodiments of the present disclosure.

FIG. 20 depicts an illustration of an example smart device control interface 2000 according to example embodiments of the present disclosure. For example, the dynamic carousel interface can be utilized to provide the different smart devices options for display in expanding and collapsing cards (e.g., as displayed in 2002 and 2004).

Figure 21:
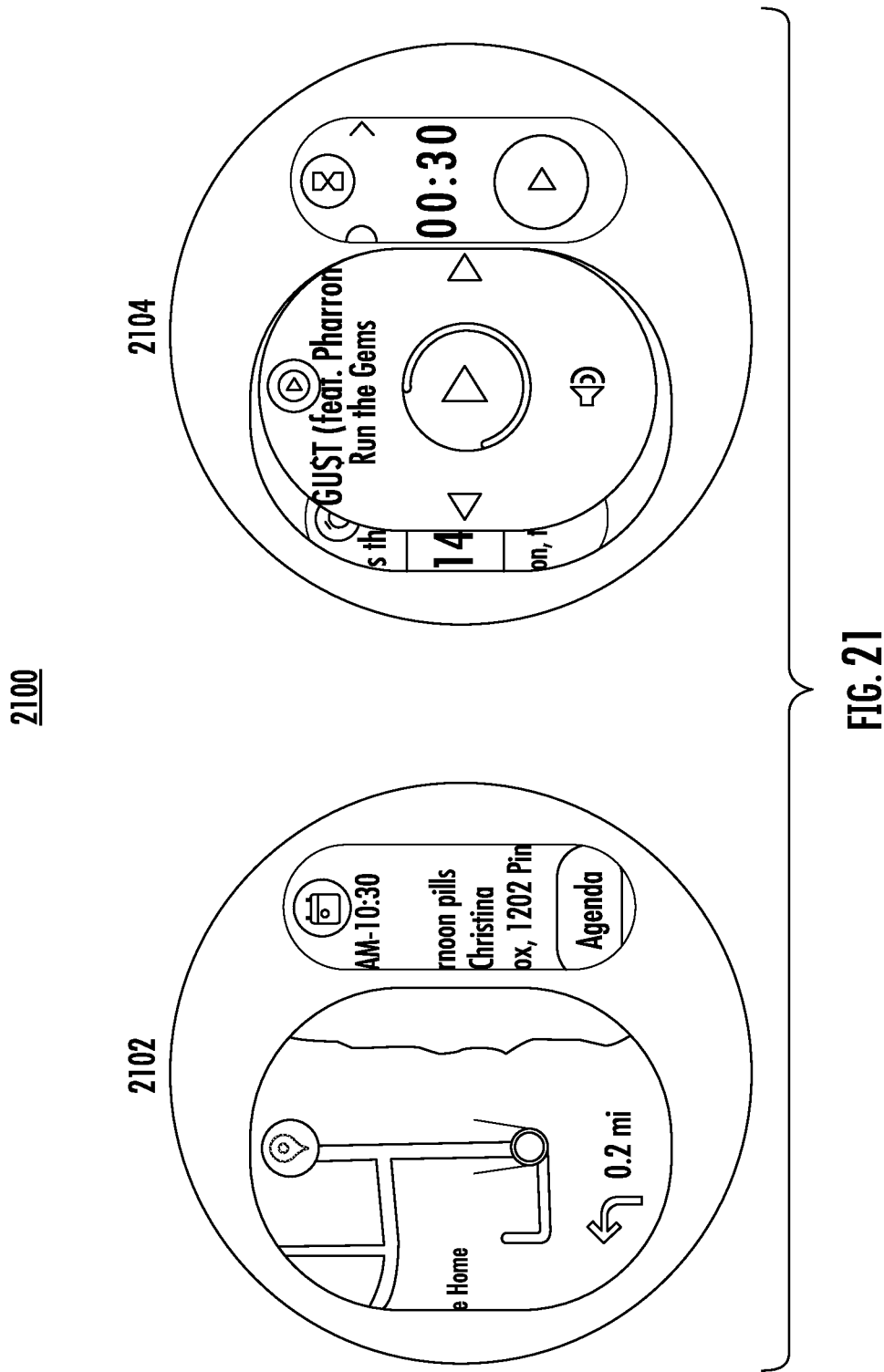
FIG. 21 depicts an illustration of an example smart wearable interface according to example embodiments of the present disclosure.

FIG. 21 depicts an illustration of an example smart wearable interface 2100 according to example embodiments of the present disclosure. The smart wearable interface 2100 can include a dynamic carousel interface to provide different smart wearable applications for display to be interacted with by a user (e.g., as displayed in 2102 and 2104).

Figure 22:
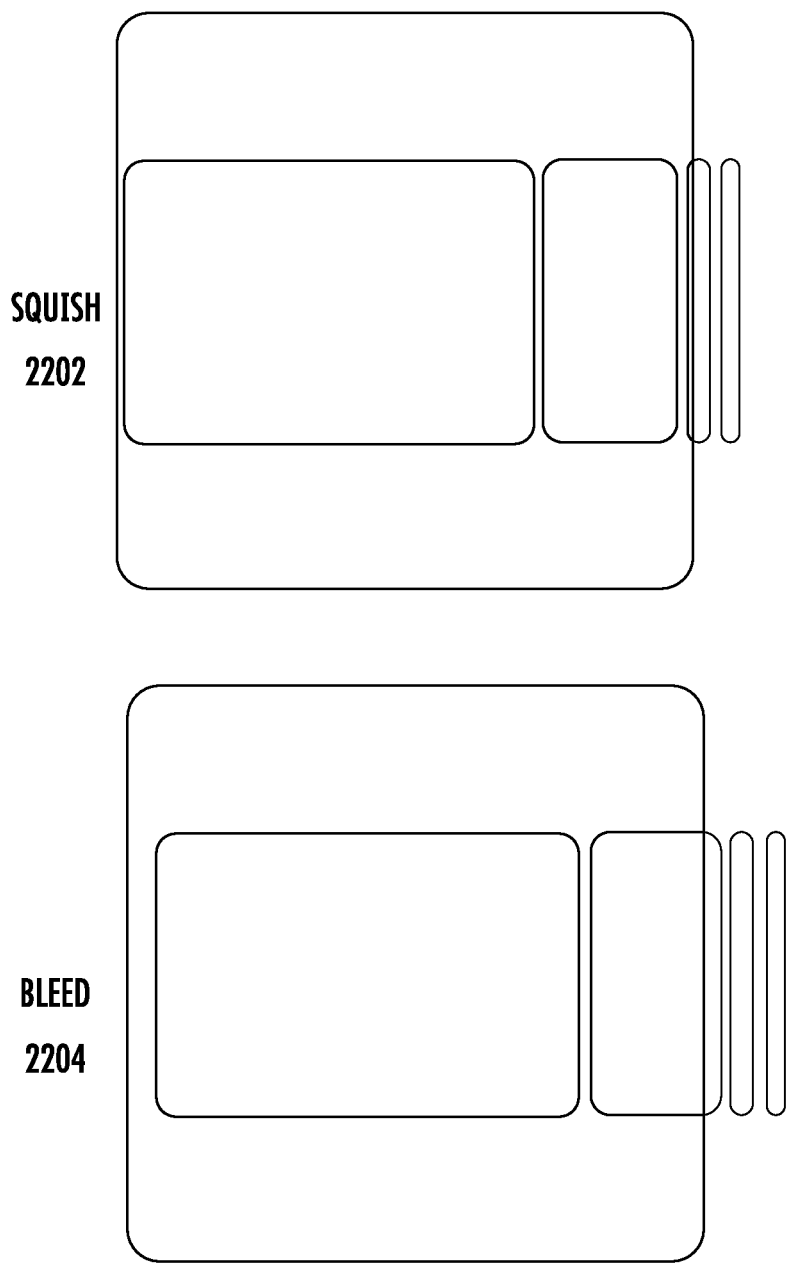
FIG. 22 depicts a block diagram of an example layout configuration feature according to example embodiments of the present disclosure.

FIG. 22 depicts a block diagram of an example layout configuration feature according to example embodiments of the present disclosure. In particular, the dynamic carousel interface can include containers that are fully provided for display in the interface (e.g., a squish feature 2202). Alternatively and/or additionally, the dynamic carousel interface can include one or more containers that are dissected by the edge of the interface (e.g., a bleed feature 2204).

Figure 23A:
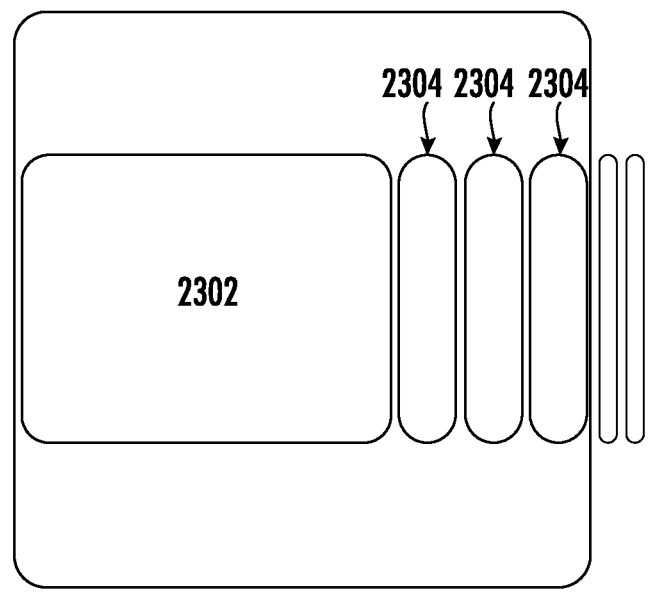
FIGS. 23A-23B depict a block diagram of example container layouts according to example embodiments of the present disclosure.
Figure 23B:
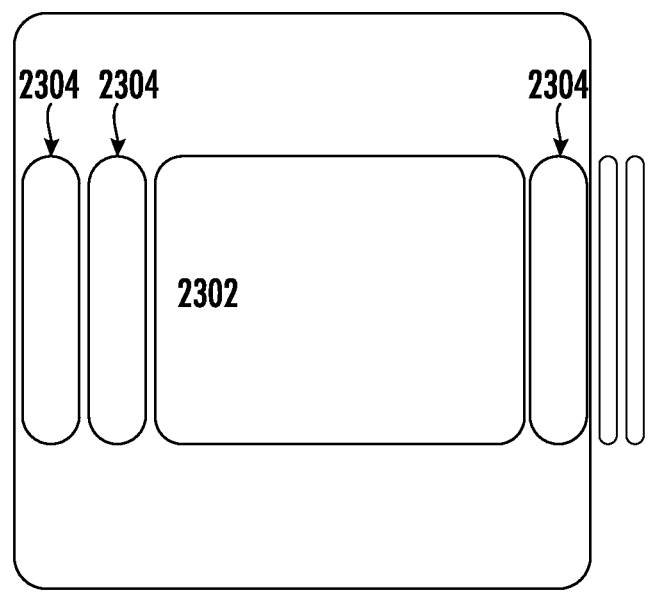

FIGS. 23A-23B depict a block diagram of example container layouts according to example embodiments of the present disclosure. The container layout can vary in configuration based on the type of content and/or based on one or more developer selections. For example, FIG. 23A can depict an expanded container 2302 to the left with collapsed containers 2304 to the right. FIG. 23B can depict an expanded container 2302 between collapsed containers 2304. In some implementations, the configurations can be fixed during scrolling. Alternatively and/or additionally, the configuration can switch from a FIG. 23A configuration to a FIG. 23B configuration in response to scrolling, or vice versa.

FIG. 24 depicts a block diagram of an example shape compression transition 2400 according to example embodiments of the present disclosure. In particular, the containers may vary in shape and size for the expanded state for the respective containers. For example, at 2402, a first container associated with a first content item can include an expanded state that includes a large rounded-edge square. At 2404, the first container may begin to collapse to a pill shape. At 2406, a second container associated with a second content item can include an expanded state that includes a large circle. At 2408, a third container associated with a third content item can include an expanded state that includes a large rounded-edge, wide rectangle.

Figure 25:
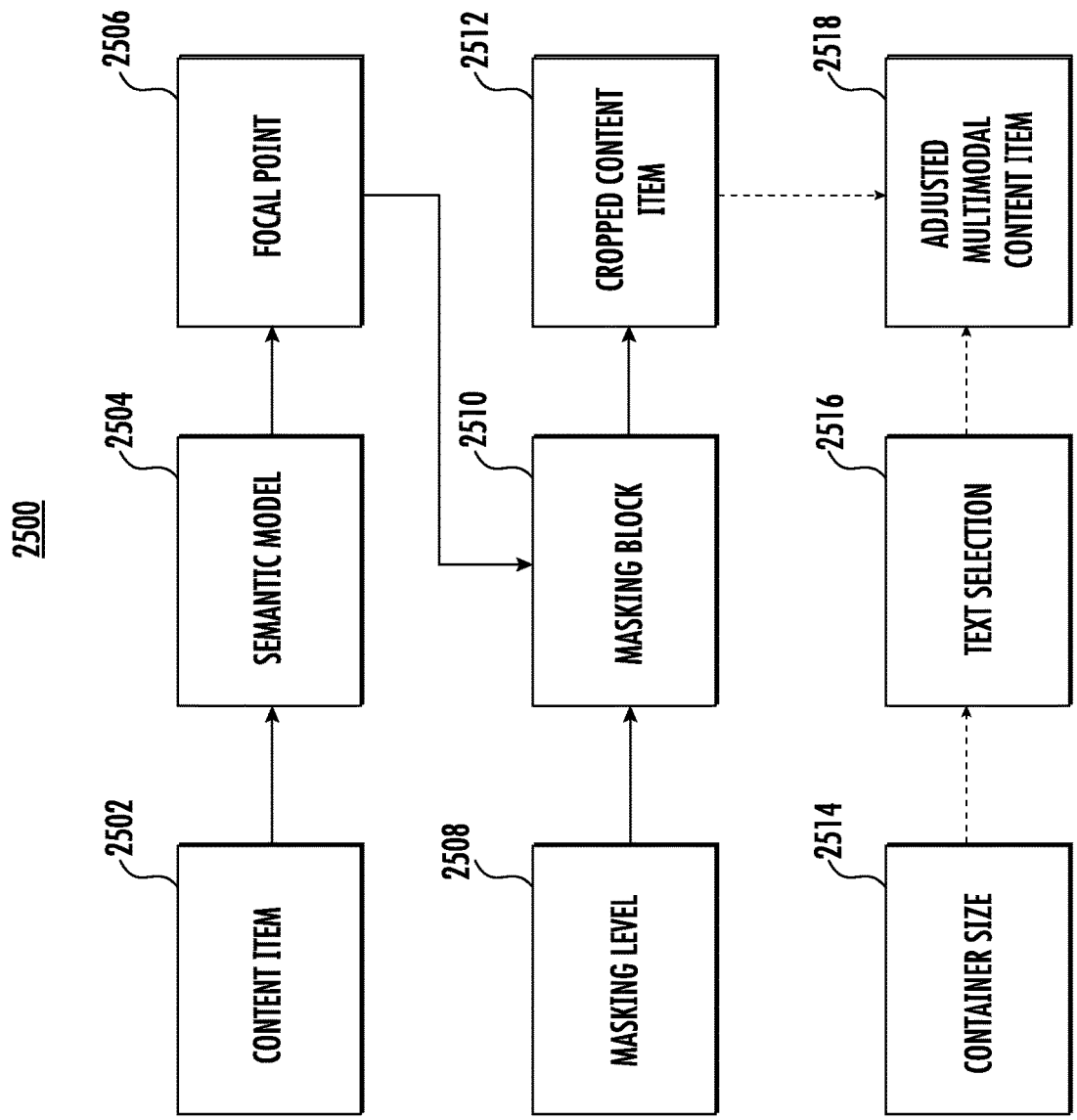
FIG. 25 depicts a block diagram of an example multimodal content item transition according to example embodiments of the present disclosure.

FIG. 25 depicts a block diagram of an example multimodal content item transition 2500 according to example embodiments of the present disclosure. In particular, a content item 2502 can be obtained to be displayed in the dynamic carousel interface. A focal point 2506 (e.g., a foreground object and/or a semantic point-of-interest) can be determined by processing the content item 2502 with a machine-learned semantic model 2504. In some implementations, the semantic model 2504 can be trained with ground truth semantic labels. Alternatively and/or additionally, the semantic model 2504 can include one or more object detection models which can process the content item 25042 to determine one or more objects. A second machine-learned model can then process the bounding boxes of the detected objects with the content item 2502 to determine a foreground object, which can be the focal point 2506.

Additionally and/or alternatively, a masking level 2508 and/or a container size 2514 can be determined based on one or more key lines. A masking level 2508 and the focal point 2506 can be processed with a masking block to generate a focal point mask that provides the desired masking level 2508, while leaving the focal point 2506 unmasked. The focal point mask can then be utilized on the content item 2502 to generate the cropped content item 2512 to be provided for display in the container.

In some implementations, the content item 2502 can be a multimodal content item. The image of the multimodal content item can be output as the cropped content item; however, the original text string may be removed and replaced with an adjusted text string. For example, the container size 2514 can be compared to a size threshold. A text selection 2516 can then be made based on the comparison. If the container size 2514 is above the size threshold, the original text string may be used. If the container size 2514 is below the size threshold, the adjusted text string can be obtained and/or generated. The selected text string can then be added to the cropped content item 2512 to generate an adjusted multimodal content item 2518.

FIG. 26 depicts a block diagram of an example container transition according to example embodiments of the present disclosure. In some implementations, the static state of the dynamic carousel interface may display a singular expanded container (e.g., at 2602). During the transition between static states, the containers may change shape and size (e.g., at 2604).

FIG. 27 depicts an illustration of example image container collapses according to example embodiments of the present disclosure. In particular, FIG. 27 can depict a content item 2702 that is being cropped to fit in a container based on three different cropping methods (e.g., contextual cropping 2704 (e.g., smart cropping), center cropped 2706, and edge cropped 2708). The content item 2702 can be an image that depicts a lighthouse on a cliff. The content item 2702 can be processed with one or more machine-learned models to determine the lighthouse is the focal point of the image. Based on the focal point determination, the contextual cropping 2704 can involve the masking of the content item 2702 such that the lighthouse is not masked regardless of the level of masking. For example, if the container is a square container 2710, the lighthouse may continue to be displayed, and the display of the lighthouse can continue for a 3:4 container 2712 and a pill-shaped container 2714. The cropping based on the determined focal point can be implemented for both horizontal cropping and vertical cropping 2716.

For center cropping 2706 and edge cropping 2708, the cropping can be based on cropping to a particular position instead of cropping based on the focal point determination. For center cropping 2706, the cropping can continually close in on a center of the content item 2702. Alternatively and/or additionally, for edge cropping 2708, the cropping can continually close in on an edge of the content item 2702. Square container 2710 cropping, 3:4 container cropping, pill-shaped container 2714 cropping, and vertical cropping 2716 for center cropping 2706 and edge cropping 2708 can be depicted in FIG. 27.

FIGS. 28A-28D depicts illustrations of example contextual cropping changes according to example embodiments of the present disclosure.

Figure 28A:
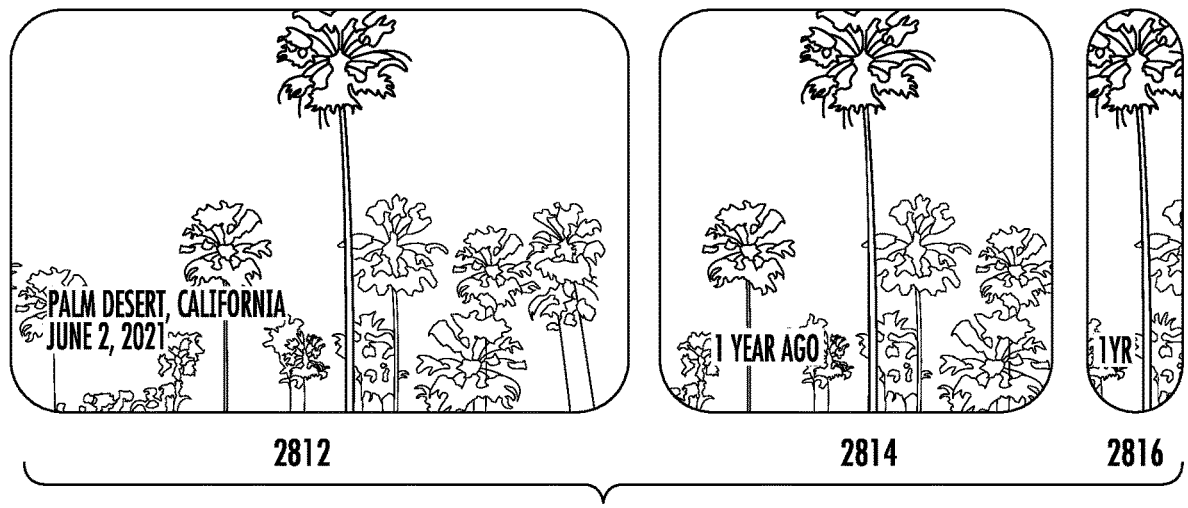
FIGS. 28A-28D depicts illustrations of example contextual cropping changes according to example embodiments of the present disclosure.

FIG. 28A depicts an illustration of a content item being cropped based on a palm tree being a focal point, and the text of the content item is replaced by abbreviated text. For example, the contextual cropping transition 2810 can include an expanded display 2812, a square display 2814, and a pill-shaped display 2816. The expanded display 2812 can depict an image with the text "Palm Desert, California Jun. 2, 2021." The square display 2814 can depict a cropped original image with the text "1 year ago." The pill-shaped display 2816 can depict the image further cropped with the text "1yr." The transitions in text can be based on key lines and/or based on one or more size thresholds that trigger the transition. The differing text can be preset, may be machine-learned, and/or may be based on heuristics.

Figure 28B:

FIG. 28B depicts an illustration of a content item being cropped based on a human face being a focal point, and the text of the content item is replaced by abbreviated text and an icon. For example, the contextual cropping transition 2820 can include an expanded display 2822 and a collapsed display 2824. The expanded display 2822 can include an image with the text "Morning Yoga 15 min Workout" and a play indicator associated with a video content item. The collapsed display 2824 can include the image cropped with based on the location of the face, an icon associated with "Morning Yoga," and the text "15 min." The contextual cropping transition 2820 of FIG. 28B can be implemented in a fitness application, and the icon can be associated with a particular exercise, a particular intensity, and/or a particular muscle group.

Figure 28C:
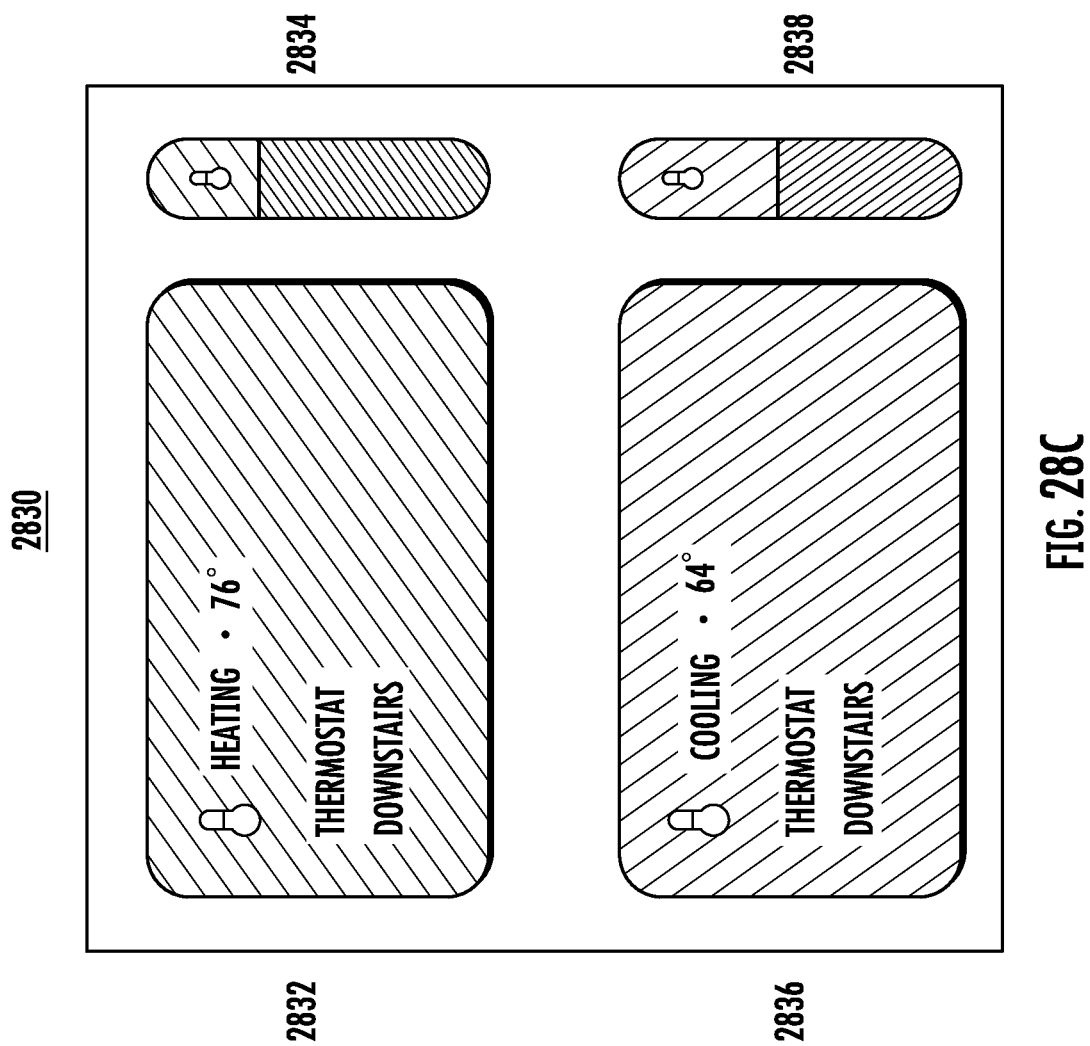

FIG. 28C depicts illustrations of example smart home interface elements 2830. For example, an expanded display (e.g., 2832 and 2836) of the smart home interface element can include text associated with a description of a control function for that particular element, an icon associated with the control function of the particular element (e.g., a thermometer icon or a fan icon for temperature control, a light bulb icon for a lighting function, and/or a lock icon for a lock function), and/or a color or pattern associated with the control function of the particular element (e.g., red or orange for heating a home, blue for cooling a home, and/or gray for when heating and cooling are turned off). The expanded display (e.g., 2832 and 2836) can then transition to a collapsed display (e.g., 2834 and 2838) based on a rotation of a carousel. The collapsed display (e.g., 2834 and 2838) can include the icon, the color or pattern, and/or a progress bar associated with a current setting for the control function (e.g., a progress bar associated with a dimming level of a light, a temperature setting level, and/or an output level). Additionally and/or alternatively, the icon may vary based on a current state of a control function (e.g., the lock icon may be closed or open based on the current lock setting).

Figure 28D:
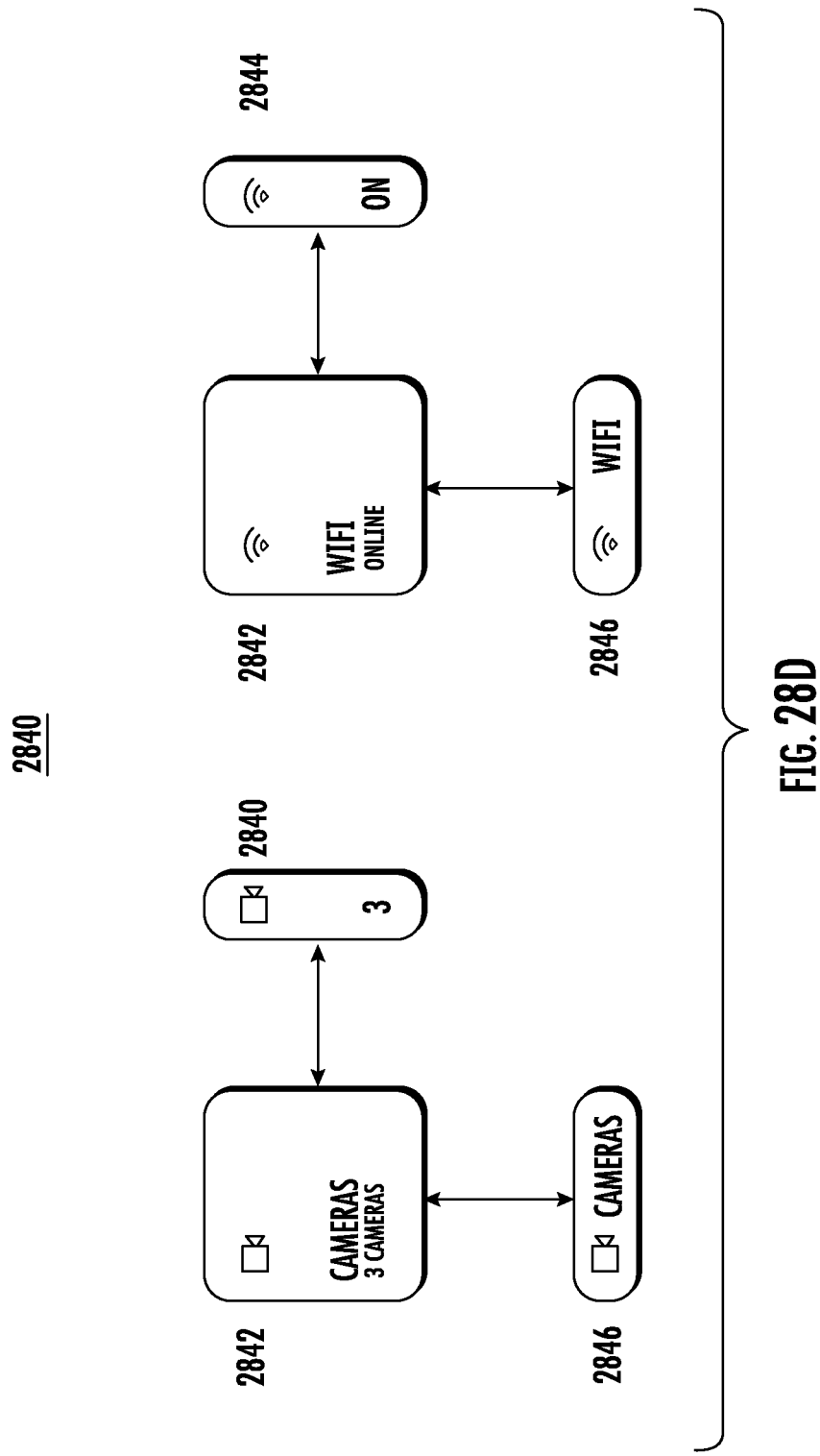

FIG. 28D depicts illustrations of example smart home interface elements 2840. The smart home interface elements 2840 can include an expanded display 2842, a horizontal collapsed display 2844, and/or a vertical collapsed display 2846. The examples in FIG. 28D can include a cameras control function element and an internet control function element. Based on one or more user inputs, the element may collapse horizontally or vertically. The horizontal collapsed display 2844 and the vertical collapsed display 2846 may include similar content and/or differing content. For example, a horizontal collapsed display 2844 can include an icon associated with the control function (e.g., a camera icon and/or a Wi-Fi icon) and/or an abbreviated description of the state of the control function (e.g., the description in the expanded display 2842 may include "3 Cameras," while the abbreviated description can be "3"), and the vertical collapsed display 2846 can include the icon associated with the control function and/or a title for the control function (e.g., Cameras or Wifi).

Example Methods

Figure 6:
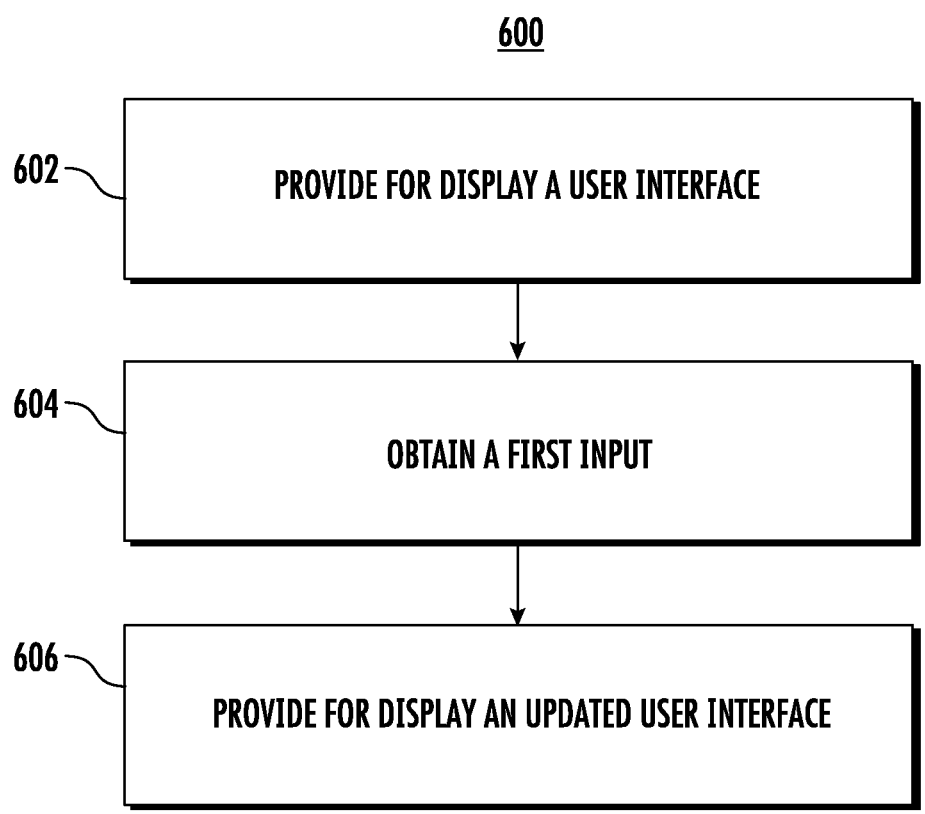
FIG. 6 depicts a flow chart diagram of an example method to perform content item display according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can provide for display a user interface. The user interface can include a content item (e.g., an image, a video, text, and/or a multimodal content item) provided for display in a display container. In some implementations, the display container can be a first size. The content item can be displayed with a first masking level. The first masking level can be based on the display container being the first size. In some implementations, the first masking level can be descriptive of an amount of the content item masked to fit into the display container at the first position. The first size can be based at least in part on a screen size of the computing device. Alternatively and/or additionally, the first size may be the same size regardless of the screen size. In some implementations, the number of content items provided for display at a single time may be determined based on screen size, carousel format, and/or user settings.

At 604, the computing system can obtain a first input. The first input can be descriptive of a navigation input to scroll through the user interface. In some implementations, the navigation input can move the display container from a first position to a second position. The first input can include a swipe gesture, a selection of a navigation element, and/or an input triggered by the passing of a particular period of time (e.g., a predetermined threshold period of time). The movement of the display container can include the movement of the content item. Additionally and/or alternatively, the movement can be a linear movement (e.g., a horizontal movement about an x-axis, a vertical movement about a y-axis, and/or a diagonal movement about an x=y line, etc.). The movement can be determined based on a center of the display container. The display container can consistently and/or progressively change in size as the movement occurs.

In some implementations, the computing system can include determining the navigation input moves the display container from a first key line to a second key line and determining a scaling transition based on the first key line and the second key line. The scaling transition can include a progressive change of a size of the display container from a first size to the second size. In some implementations, the computing system can include causing the scaling transition to occur as the display container travels from the first position to the second position. The first key line can be associated with the first position. Additionally and/or alternatively, the first key line can be associated with the first size. The second key line can be associated with the second position. The second key line can be associated with the second size.

In some implementations, the scaling transition can include adjusting a display container size proportional to a difference between the first size and the second size. Additionally and/or alternatively, the scaling transition can include adjusting a mask level proportional to a difference between the first mask level and the second mask level.

At 606, the computing system can provide for display an updated user interface. The updated user interface can include the content item being provided for display in an updated display container of a second size. In some implementations, the second size can be smaller than the first size. Additionally and/or alternatively, the content item can be displayed with a second masking level. The second masking level can be based on the display container being the second size. The second masking level can mask a larger portion of the content item than the first masking level. In some implementations, the second masking level can be descriptive of an amount of the content item masked to fit into the updated display container at the second position. The second size can be based at least in part on a screen size of the computing device. Alternatively and/or additionally, the second size may be the same size regardless of the screen size. The updated user interface can include a same (e.g., matching or substantially similar to) format as the initial user interface with different containers being displayed at the different respective sizes of the layout. For example, the display container may change from a first size to a second size, while the updated user interface may include a second display container being the first size.

Alternatively and/or additionally, the computing system can include determining a focal point of the content item and determining a portion of the content item to mask based on the focal point. Determining the focal point of the content item can include processing the content item with a first machine-learned model to generate one or more object detection outputs and processing the one or more object detection outputs with a second machine-learned model to generate a focal point classification. The focal point classification can be descriptive of a semantic intent of a content item (e.g., a foreground object in an image). The masking can be performed such that the focal point stays visible even as the display container collapses.

In some implementations, the computing system can include determining the display container is at a third position. The third position can be between the first position and the second position. An intermediate user interface can then be provided for display. The intermediate user interface can include the content item provided for display in an intermediate display container of a third size. The third size can be smaller than the first size. In some implementations, the third size can be larger than the second size.

Figure 7:
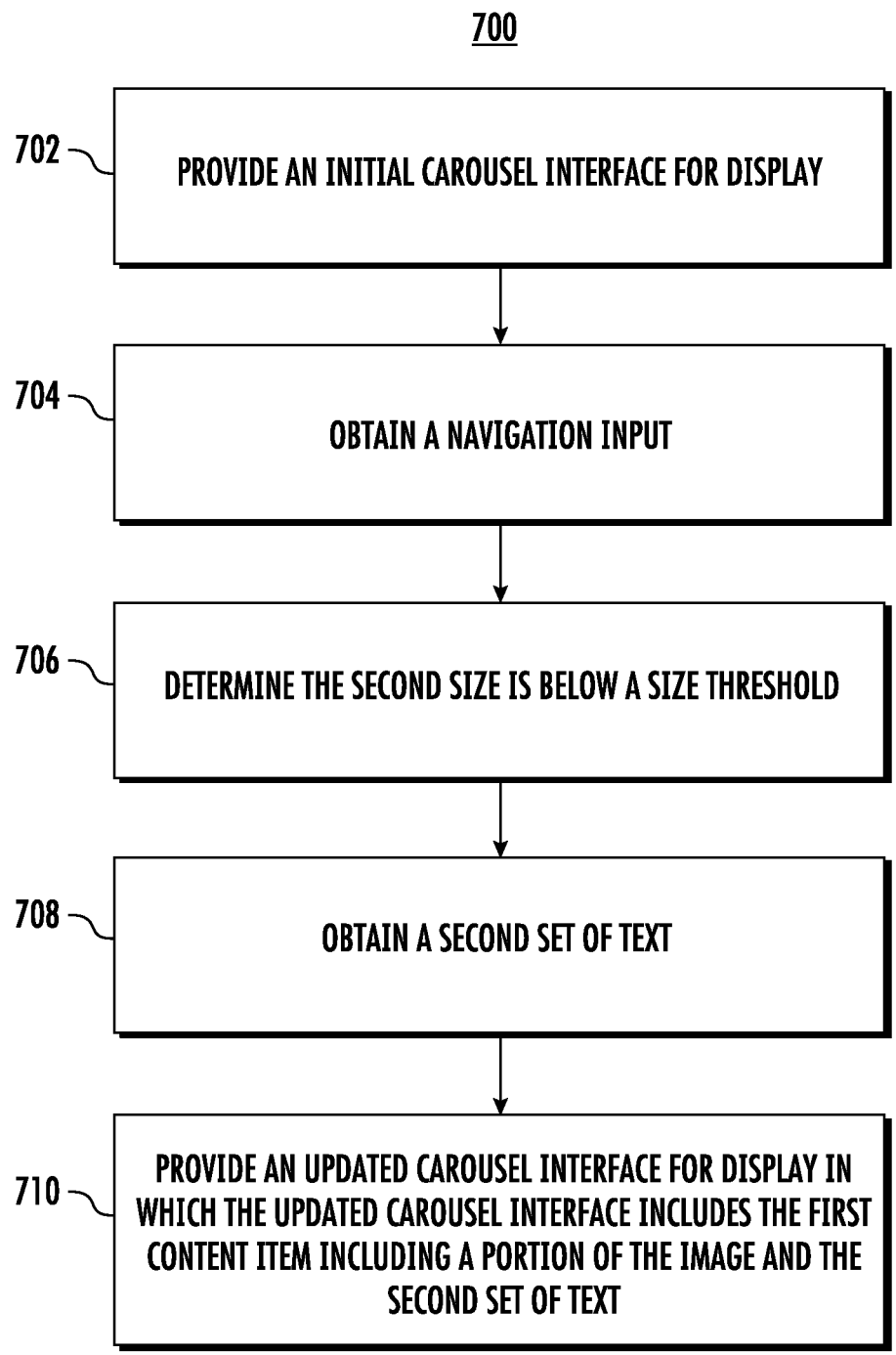
FIG. 7 depicts a flow chart diagram of an example method to perform multimodal content item display according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can provide an initial carousel interface for display. The initial carousel interface can include a plurality of content items. The initial carousel interface can include a first content item of the plurality of content items being provided for display in a first container of a first size. In some implementations, the first container can be at a first position. Additionally and/or alternatively, the first content item can include a multimodal content item. The multimodal content item can include an image and a first set of text. In some implementations, the initial carousel interface can include a second content item and a third content item. The second content item of the plurality of content items can be provided for display in a second container, and the third content item of the plurality of content items can be provided for display in a third container of a third size. The second container can be at a second position. The third container can be at a third position. The first position can be associated with a first key line, and the second line can be associated with a second position. Additionally and/or alternatively, the first key line can be associated with the first size such that the display container can be a first size when coinciding with the first key line, and the second key line can be associated with the second size such that the display container can be a second size when coinciding with the second key line.

At 704, the computing system can obtain a navigation input. The navigation input can be associated with a navigation associated with a carousel of the initial carousel interface. The navigation input can be descriptive of a gesture and/or a selection received via a touchscreen. In some implementations, the navigation can scroll through the content items of the carousel.

At 706, the computing system can determine the second size is below a size threshold. The threshold size may be predetermined. Alternatively and/or additionally, the size threshold may be based on one or more determined attributes of the content item. In some implementations, the size threshold can be content item specific and may be set by a developer of the carousel.

At 708, the computing system can obtain a second set of text. The second set of text can differ from a first set of text. The first set of text can be provided for display when the content item is provided for display when displaying at an expanded state. The second set of text can include less characters than the first set of text.

At 710, the computing system can provide an updated carousel interface for display in which the updated carousel interface includes the first content item including a portion of the image and the second set of text. The updated carousel interface can include the first content item of the plurality of content items being provided for display in the first container of a second size. In some implementations, a portion of the first content item can be masked based on the first container being the second size. The first container can be at a second position. Additionally and/or alternatively, the updated carousel interface can include a second content item of the plurality of content items being provided for display in a second container of the first size. The second container can be at the first position. The change of the first container from the first size to the second size may be a progressive change such that as the container reaches a halfway position between the first position and the second position, the first container may be halfway through the transition from the first size to the second size.

Figure 8:
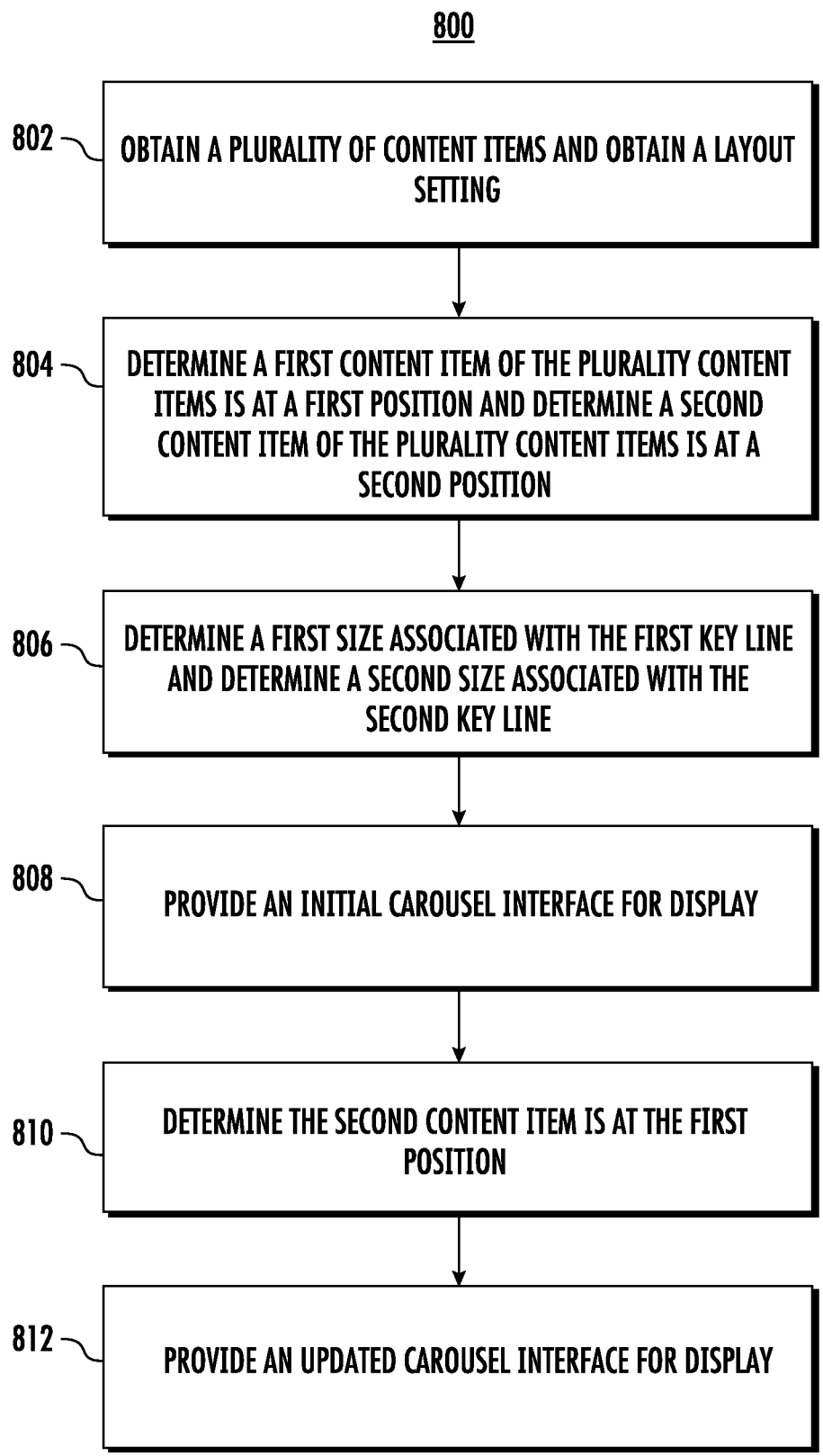
FIG. 8 depicts a flow chart diagram of an example method to perform dynamic carousel display according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of content items and obtain a layout setting. The plurality of content items can include a plurality of images. Alternatively and/or additionally, the plurality of content items can include one or more multimodal content items, which can include image data and text data. In some implementations, the plurality of content items can include one or more image content items, one or more video content items, one or more audio content items, one or more multimodal content items, and/or one or more other content items. The plurality of content items can be obtained based on a search query in which the plurality of content items are responsive to the search query. Alternatively and/or additionally, the plurality of content items can be obtained from a database based on a plurality of content items selected and/or generated by a third party computing system.

The layout setting can include a plurality of key lines. In some implementations, each key line of the plurality of key lines can be associated with a particular container size. The plurality of key lines may be determined based on one or more selections by a third party computing system. Alternatively and/or additionally, the plurality of key lines may be predetermined. In some implementations, the plurality of key lines can differ between a first layout setting and a second layout setting.

At 804, the computing system can determine a first content item of the plurality content items is at a first position and determine a second content item of the plurality content items is at a second position. The first position can be associated with a first key line of the plurality of key lines. The first content item can include a first image. The second position can be associated with a second key line of the plurality of key lines. The second content item can include a second image.

At 806, the computing system can determine a first size associated with the first key line and determine a second size associated with the second key line. The first size can be a container size that displays all or almost all of the content item with little to no masking. The second size can be a container size that displays a portion of the content item with at least a portion of the content item being masked. The second size can be two times the radius of a corner curve of the display container.

At 808, the computing system can provide an initial carousel interface for display. The initial carousel interface can include a plurality of containers associated with the plurality of content items. In some implementations, the initial carousel interface can include a portion of the first content item being provided for display in a first container. The first container can be the first size. Additionally and/or alternatively, the initial carousel interface can include a portion of the second content item being provided for display in a second container. The second container can be the second size. In some implementations, the second size can be based at least in part on a determined width of a container corner. Additionally and/or alternatively, the initial carousel interface may include a plurality of display containers of the first size.

At 810, the computing system can determine the second content item is at the first position. The determination can be triggered in response to a user input that causes the carousel to rotate the positions of the content items.

At 812, the computing system can provide an updated carousel interface for display. The updated carousel interface can include the second content item being provided for display in the second container. The second container can be the first size. In some implementations, the updated carousel interface can include a plurality of display containers of the first size. In some implementations, the updated carousel interface can include the first content item being provided in the first container in which the first container is a second size. The transition from the first size to the second size can be based on the width of the full size container state versus the width of the collapsed container state.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for providing one or more content items for display, the computing system comprising:
   one or more processors; and
   one or more non-transitory computer-readable media that collectively store instructions that, when executed by the one or more processors, cause the computing system to perform operations, the operations comprising:
   providing for display a user interface, wherein the user interface comprises a content item provided for display in a display container, wherein the display container is a first size, wherein the content item is displayed with a first masking level based on the first size;
   obtaining a first input, wherein the first input is descriptive of a navigation input to scroll through the user interface, wherein the navigation input moves the display container from a first position to a second position;
   processing the first content item with a first machine-learned model to generate one or more object detection outputs:
   processing the one or more object detection outputs with a second machine-learned model to generate a focal point classification descriptive of a foreground object being determined;
   determining a portion of the first content item to provide for display and a portion to mask based on the focal point classification; and
   providing for display an updated user interface, wherein the updated user interface comprises the content item provided for display in an updated display container of a second size, wherein the second size is smaller than the first size, wherein the content item is displayed with a second masking level based on the second size, wherein the second masking level masks a larger portion of the content item than the first masking level, and wherein the foreground object of the first content item continues to be provided for display as the first container decreases in size based on the focal point classification.

2. The computing system of claim 1, wherein the first masking level is descriptive of an amount of the content item masked to fit into the display container at the first position.

3. The computing system of claim 1, wherein the second masking level is descriptive of an amount of the content item masked to fit into the updated display container at the second position.

4. The computing system of claim 1, wherein obtaining the navigation input comprises tracking a user gaze with an image sensor.

5. The computing system of claim 1, wherein the first machine-learned model comprises one or more object detection models that processes the first content item to generate bounding boxes for detected objects, and wherein the second machine-learned model processes the bounding boxes of the detected objects to generate the focal point classification descriptive of a semantic intent of the first content item.

6. The computing system of claim 1, wherein the operations further comprise:
   determining the content item is at a third position, wherein the third position is between the first position and the second position; and
   providing an intermediate user interface, wherein the intermediate user interface comprises the content item provided for display in an intermediate display container of a third size, wherein the third size is smaller than the first size, wherein the third size is larger than the second size.

7. The computing system of claim 6, wherein the intermediate user interface comprises the content item being displayed with a third masking level, and wherein the third masking level masks a larger portion of the content item than the first masking level, and wherein the third masking level masks a smaller portion of the content item than the second masking level.

8. The computing system of claim 1, wherein the operations further comprise:
   determining the navigation input moves the display container from a first key line to a second key line;
   determining a scaling transition based on the first key line and the second key line, wherein the scaling transition comprises a progressive change of a size of the display container from a first size to the second size; and
   causing the scaling transition to occur as the display container travels from the first position to the second position.

9. The computing system of claim 8, wherein the first key line is associated with the first position, wherein the first key line is associated with the first size, wherein the second key line is associated with the second position, and wherein the second key line is associated with the second size.

10. The computing system of claim 8, wherein the scaling transition comprises:
    adjusting a display container size proportional to a difference between the first size and the second size; and
    adjusting a mask level proportional to a difference between the first mask level and the second mask level.

11. A computer-implemented method for providing one or more content items for display, the method comprising:
    providing, by a computing system comprising one or more processors, an initial carousel interface for display, wherein the initial carousel interface comprises a plurality of content items, wherein the initial carousel interface comprises a first content item of the plurality of content items being provided for display in a first container of a first size, and wherein the first container is at a first position;
    obtaining, by the computing system, a navigation input, wherein the navigation input is associated with a navigation associated with a carousel of the initial carousel interface;
    processing, by the computing system, the first content item with a first machine-learned model to generate one or more object detection outputs;
    processing, by the computing system, the one or more object detection outputs with a second machine-learned model to generate a focal point classification descriptive of a foreground object being determined;
    determining, by the computing system, a portion of the first content item to provide for display and a portion to mask based on the focal point classification; and
    providing, by the computing system, an updated carousel interface for display, wherein the updated carousel interface comprises the first content item of the plurality of content items being provided for display in the first container of a second size, wherein a portion of the first content item is masked based on the first container being the second size, wherein the first container is at a second position, wherein the foreground object of the first content item continues to be provided for display as the first container decreases in size based on the focal point classification, wherein the updated carousel interface comprises a second content item of the plurality of content items being provided for display in a second container of the first size, and wherein the second container is at the first position.

12. The method of claim 11, further comprising:
    obtaining, by the computing system, display size data associated with a particular display device, wherein the display size data is descriptive of a display size for the particular display device; and
    wherein the first size and the second size are based at least in part on the display size data.

13. The method of claim 11, wherein the initial carousel interface comprises a third content item, wherein a third content item of the plurality of content items is provided for display in a third container of a third size, and wherein the third container is at a third position.

14. The method of claim 11, wherein the first content item comprises a multimodal content item, wherein the multimodal content item comprises an image and a first set of text.

15. The method of claim 14, further comprising:
    determining, by the computing system, the second size is below a size threshold;
    obtaining, by the computing system, a second set of text; and
    wherein the updated carousel interface comprises the first content item comprising a portion of the image and the second set of text.

16. One or more non-transitory computer-readable media that collectively store instructions that, when executed by one or more computing devices, cause the one or more computing devices to perform operations, the operations comprising:
    obtaining a plurality of content items;
    obtaining a layout setting, wherein the layout setting comprises a plurality of key lines, wherein each key line of the plurality of key lines are associated with a particular container size;
    determining a first content item of the plurality content items is at a first position, wherein the first position is associated with a first key line of the plurality of key lines;
    determining a second content item of the plurality content items is at a second position, wherein the second position is associated with a second key line of the plurality of key lines;
    determining a first size associated with the first key line;
    determining a second size associated with the second key line;
    processing the first content item with a first machine-learned model to generate one or more object detection outputs;

processing the one or more object detection outputs with a second machine-learned model to generate a focal point classification descriptive of a foreground object being determined;

determining a portion of the first content item to provide for display and a portion to mask based on the focal point classification descriptive of a focal point;

providing an initial carousel interface for display, wherein the initial carousel interface comprises a plurality of containers associated with the plurality of content items, wherein the initial carousel interface comprises at least a portion of the first content item being provided for display in a first container and a portion to mask based on the focal point, wherein the first container is the first size, wherein the initial carousel interface comprises at least a portion of the second content item being provided for display in a second container, wherein the second container is the second size;

determining the second content item is at the first position; and providing an updated carousel interface, wherein the updated carousel interface comprises the second content item being provided for display in the second container, wherein the second container is the first size, and wherein the foreground object of the first content item continues to be provided for display as the first container decreases in size.

17. The one or more non-transitory computer-readable media of claim 16, wherein the second size is based at least in part on a determined width of a container corner.

18. The one or more non-transitory computer-readable media of claim 16, wherein the initial carousel interface comprises a plurality of display containers of the first size.

19. The one or more non-transitory computer-readable media of claim 16, wherein the updated carousel interface comprises a plurality of display containers of the first size.

20. The one or more non-transitory computer-readable media of claim 16, wherein the plurality of content items comprise a plurality of images.

* * * * *